US012666403B2

(12) United States Patent
Zhou et al.

(10) Patent No.: US 12,666,403 B2
(45) Date of Patent: Jun. 23, 2026

(54) WIRELESS COMMUNICATION METHOD FOR TRANSMISSON OPPORTUNITY SHARING AND STATION DEVICE

(71) Applicant: GUANGDONG OPPO MOBILE TELECOMMUNICATIONS CORP., LTD., Dongguan (CN)

(72) Inventors: Pei Zhou, Dongguan (CN); Lei Huang, Singapore (SG); Chaomin Luo, Dongguan (CN); Liuming Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 213 days.

(21) Appl. No.: 18/485,283

(22) Filed: Oct. 11, 2023

(65) Prior Publication Data

US 2024/0057044 A1     Feb. 15, 2024

Related U.S. Application Data

(63) Continuation of application No. PCT/CN2021/094994, filed on May 20, 2021.

(51) Int. Cl.
*H04W 72/044* (2023.01)
*H04W 74/0816* (2024.01)

(52) U.S. Cl.
CPC ..... *H04W 72/044* (2013.01); *H04W 74/0816* (2013.01)

(58) Field of Classification Search
CPC ........... H04W 72/044; H04W 74/0816; H04W 72/0446; H04W 74/006; H04W 84/12;
(Continued)

(56) References Cited

U.S. PATENT DOCUMENTS

| | | | | |
|---|---|---|---|---|
| 11,438,889 | B2 * | 9/2022 | Nezou ............... | H04W 74/0816 |
| 2015/0223268 | A1 * | 8/2015 | Ghosh ................... | H04L 1/1685 |
| | | | | 370/329 |

(Continued)

FOREIGN PATENT DOCUMENTS

| | | | |
|---|---|---|---|
| CN | 105578423 | A | 5/2016 |
| CN | 106922034 | A | 7/2017 |

(Continued)

OTHER PUBLICATIONS

Supplementary European Search Report in the corresponding European patent application No. 21940193.2, mailed on Feb. 29, 2024.
(Continued)

*Primary Examiner* — Ivan O Latorre

(74) *Attorney, Agent, or Firm* — Ladas & Parry, LLP

(57) ABSTRACT

A wireless communication method, a station device, an access point (AP) device are provided. The wireless communication method includes: an AP transmits first information, the first information being used for sharing some or all of the time domain resources of a TXOP obtained by the AP to multiple STAs. The first information is used for indicating at least one of: address information of the multiple STAs, time duration information of time domain resources corresponding to the multiple STAs, start time domain positions of the time domain resources respectively corresponding to the multiple STAs, and the time domain resources respectively corresponding to the multiple STAs.

20 Claims, 13 Drawing Sheets

(58) Field of Classification Search
CPC ........... H04W 72/0453; H04W 72/535; H04W 74/04

See application file for complete search history.

(56)                    References Cited

U.S. PATENT DOCUMENTS

| | | | | |
|---|---|---|---|---|
| 2016/0028466 | A1* | 1/2016 | Han ......................... | H04B 7/14 370/315 |
| 2017/0325239 | A1 | 11/2017 | Xing | |
| 2018/0167941 | A1 | 6/2018 | Zhang | |
| 2018/0310338 | A1 | 10/2018 | Li | |
| 2018/0376491 | A1* | 12/2018 | Ferdowsi .......... | H04W 72/1268 |
| 2019/0230709 | A1 | 7/2019 | Li | |
| 2021/0360695 | A1 | 11/2021 | Zhou | |
| 2021/0410163 | A1* | 12/2021 | Xia ..................... | H04W 72/121 |
| 2022/0295468 | A1* | 9/2022 | Huang ................ | H04W 74/006 |
| 2023/0354424 | A1* | 11/2023 | Nezou .............. | H04W 74/0816 |
| 2023/0413327 | A1* | 12/2023 | Kim .................. | H04W 74/0816 |
| 2024/0057044 | A1* | 2/2024 | Zhou .................. | H04W 74/006 |
| 2024/0098789 | A1* | 3/2024 | Zhou ..................... | H04W 74/06 |
| 2024/0314860 | A1* | 9/2024 | Quan ...................... | H04W 8/20 |
| 2024/0323815 | A1* | 9/2024 | Zhou .................... | H04W 48/16 |
| 2025/0031255 | A1* | 1/2025 | Hou .................. | H04W 74/0808 |
| 2025/0203591 | A1* | 6/2025 | Lu ..................... | H04W 72/0453 |

FOREIGN PATENT DOCUMENTS

| | | |
|---|---|---|
| CN | 109417800 A | 3/2019 |
| CN | 110050505 A | 7/2019 |
| CN | 110547026 A | 12/2019 |
| JP | 2010263493 A | 11/2010 |
| JP | 2017525196 A | 8/2017 |
| WO | 2017074025 A1 | 5/2017 |
| WO | 2022241739 A1 | 11/2022 |

OTHER PUBLICATIONS

Dibakar Das (Intel), "PDT: Channel access for Triggered TXOP Sharing", IEEE P802.11 Wireless LANs, doc.: IEEE 802.11-21/0268r8, Date: Mar. 17, 2021.

Dibakar Das, Intel, "Resolving TBDs in Triggered SU operation", doc.: IEEE 802.11-14/0270r1, Date: Feb. 1, 2021.

IEEE P802.11beTM/D0.4, Draft Standard for Information technology— Tele-communications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), Mar. 2021. section 9.3.1.22.1.2.2; p. 86, section 9.3.1.22.5; p. 94-p. 95, section 35.2.1.3; p. 189-p. 190. 511 pages.

First Office Action of the Chinese patent application No. 202311870158.X, issued on Jan. 1, 2025, 22 pages with English translation.

International Search Report in the International Application No. PCT/CN2021/094994, mailed on Jan. 26, 2022, with English translation provided by WIPO.

Written Opinion of the International Searching Authority in the International Application No. PCT/CN2021/094994, mailed on Jan. 26, 2022, with English translation provided by WIPO.

"TXOP Sharing for use in MU P2P", Jay Yang, et al. (Nokia), Date: Apr. 19, 2021, Doc.: IEEE 802.11-20/1938r5, all pages.

"PDT: Channel access for Triggered TXOP Sharing", Dibakar Das, Intel, Date: Mar. 17, 2021, doc.: IEEE 802.11-21/0268r7, all pages.

"Spec Text for TXOP Return for Triggered SU", Yunbo Li (Huawei), Date: Mar. 27, 2021, doc.: IEEE 802.11-21/0552r5, all pages.

"TXOP Sharing for use in MU P2P", Jay Yang, et al. (Nokia), Date: Apr. 19, 2021, Doc.: IEEE 802.11-20/1938r4, the whole document.

Notice of Reasons for Refusal in the corresponding Japanese Patent Application No. 2023-564080, issued on May 23, 2025.

First Office Action of the corresponding Korean patent application No. 10-2023-7039606, issued on Jan. 21, 2026.

Office Action of the counterpart Indian patent application No. 202317082767, issued on Apr. 17, 2026.

* cited by examiner

100

User Info field format

User Info field format

TXOP sharing release frame format bit          12          *j*          28 - *j*

User Info field format bit          12          28

User Info field format

<u>300</u>

<u>400</u>

The AP acquires remaining time domain resources shared by the AP to a first STA of a plurality of STAs.    S410

Access point device 500

Communication unit 510

WIRELESS COMMUNICATION METHOD FOR TRANSMISSON OPPORTUNITY SHARING AND STATION DEVICE

CROSS-REFERENCE TO RELATED APPLICATION

The present disclosure is a US continuation application of International Application No. PCT/CN2021/094994 filed on May 20, 2021. The disclosure of the above application is hereby incorporated by reference in its entirety.

BACKGROUND

In standard 802.11be, a transmission opportunity (TXOP) sharing mechanism is proposed. How to implement the TXOP sharing is an urgent problem to be solved.

SUMMARY

Embodiments of the present disclosure relate to the field of communication, and more particularly, to a method for wireless communication, a station device and an access point device.

Embodiments of the present disclosure provide a method for wireless communication, a station device and an access point device. An Access Point (AP) can share part or all of time domain resources of a TXOP acquired by the AP to a plurality of stations (STAs).

In a first aspect, a method for wireless communication is provided. The method includes the following operation.

An AP transmits first information. The first information is used for sharing part or all of time domain resources of a TXOP acquired by the AP to a plurality of STAs. The first information is used to indicate at least one of following information.

Address information of the plurality of the STAs, time duration information of time domain resources corresponding to the plurality of the STAs, start time domain positions of time domain resources corresponding to the plurality of the STAs, and time-frequency domain resources corresponding to the plurality of the STAs.

In a second aspect, a method for wireless communication is provided. The method includes the following operation.

A first STA receives first information transmitted by an Access Point (AP), the first information is used to share part or all of time domain resources of a TXOP acquired by the AP to a plurality of STAs, and the first STA is included in the plurality of the STAs.

The first information is used to indicate at least one of following information.

Address information of the plurality of the STAs, time duration information of time domain resources corresponding to the plurality of the STAs, start time domain positions of time domain resources corresponding to the plurality of the STAs, and time-frequency domain resources corresponding to the plurality of the STAs.

In a third aspect, a method for wireless communication is provided. The method includes the following operations.

An AP determines that part or all of time domain resources of an acquired TXOP are shared to a plurality of STAs.

The AP transmits first information to a first STA of the plurality of the STAs, and the first information is used to indicate at least one of following information.

Address information of the first STA, time duration information of time domain resources corresponding to the first STA, a start time domain position of time domain resources corresponding to the first STA, and time-frequency domain resources corresponding to the first STA.

In a fourth aspect, a method for wireless communication is provided. The method includes the following operation.

A first STA receives first information transmitted by an AP, wherein the first STA belongs to a plurality of STAs, and the plurality of the STAs are STAs sharing part or all of time domain resources of a TXOP acquired by the AP.

The first information is used to indicate at least one of following information.

Address information of the first STA, time duration information of time domain resources corresponding to the first STA, a start time domain position of time domain resources corresponding to the first STA, and time-frequency domain resources corresponding to the first STA.

In a fifth aspect, a method for wireless communication is provided. The method includes the following operation.

An AP acquires remaining time domain resources shared by the AP to a first STA of a plurality of STAs.

In a sixth aspect, an access point device is provided for performing the method in the first aspect as described above.

Specifically, the access point device includes functional modules for performing the method in the first aspect as described above.

In a seventh aspect, a station device is provided for performing the method in the second aspect as described above.

Specifically, the station device includes functional modules for performing the method in the second aspect as described above.

In an eighth aspect, an access point device is provided for performing the method in the third aspect as described above.

Specifically, the access point device includes functional modules for performing the method in the third aspect as described above.

In a ninth aspect, a station device is provided for performing the method in the fourth aspect as described above.

Specifically, the station device includes functional modules for performing the method in the fourth aspect as described above.

In a tenth aspect, an access point device is provided for performing the method in the fifth aspect as described above.

Specifically, the access point device includes functional modules for performing the method in the fifth aspect as described above.

In an eleventh aspect, an access point device including a processor and a memory for storing a computer program is provided, and the processor is configured to call and run the computer program stored in the memory to perform the method in the first aspect as described above.

In a twelfth aspect, a station device including a processor and a memory for storing a computer program is provided, and the processor is configured to call and run the computer program stored in the memory to perform the method in the second aspect as described above.

In a thirteenth aspect, an access point device including a processor and a memory for storing a computer program is provided, and the processor is configured to call and run the computer program stored in the memory to perform the method in the third aspect as described above.

In a fourteenth aspect, a station device including a processor and a memory for storing a computer program is provided, and the processor is configured to call and run the computer program stored in the memory to perform the method in the fourth aspect as described above.

In a fifteenth aspect, an access point device including a processor and a memory for storing a computer program is provided, and the processor is configured to call and run the computer program stored in the memory to perform the method in the fifth aspect as described above.

In a sixteenth aspect, an apparatus is provided for implementing the method in any one of the first aspect to the fifth aspect as described above.

Specifically, the apparatus includes a processor configured to call and run a computer program from a memory, to cause a device on which the chip is installed to perform the method in any one of the first aspect to the fifth aspect as described above.

In a seventeenth aspect, a computer-readable storage medium is provided for storing a computer program, and the computer program causes a computer to perform the method in any one of the first aspect to the fifth aspect as described above.

In a eighteenth aspect, a computer program product including computer program instructions is provided, and the computer program instructions cause a computer to perform the method in any one of the first aspect to the fifth aspect as described above.

In a nineteenth aspect, a computer program is provided, when ran on a computer, causing the computer to perform the method in any one of the first aspect to the fifth aspect as described above.

DETAILED DESCRIPTION

The technical solution in embodiments of the present disclosure will be described below in combination with the appended drawings in embodiments of the present disclosure. It is obvious that the described embodiments are part of the embodiments of the present disclosure, rather than all of the embodiments. With respect to the embodiments in the present disclosure, all other embodiments obtained by ordinary persons skilled in the art without creative efforts fall within the scope of protection of the present disclosure.

The technical solution of the embodiment of the disclosure can be applied to various communication systems, such as a Wireless Local Area Network (WLAN), a Wireless Fidelity (WFI) or other communication systems. Based on the technical solutions of the embodiments of the disclosure, an AP can share part or all of time domain resources of a TXOP acquired by the AP to a plurality of STAs, thereby reducing the communication delay of the STAs.

Figure 1:
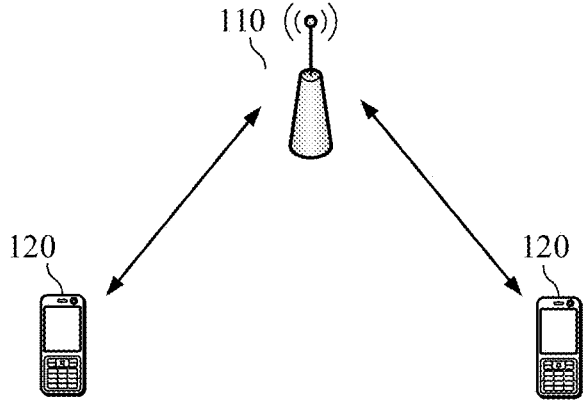
FIG. 1 is a schematic diagram of a communication system architecture applied to embodiments of the present disclosure.

Exemplary, a communication system 100 applied in embodiments of the present disclosure is shown in FIG. 1. The communication system 100 may include an Access Point (AP) device 110 and a STATION (STA) device 120 that accesses a network through the AP device 110.

In the embodiments of the present disclosure, the STA device may be arranged on land including indoor or outdoor areas, handheld, wearable or on-board; the terminal device may also be arranged on the water (such as on a ship, etc.); the terminal device may further be arranged in the air (such as on an airplane, a balloon, or a satellite, etc.).

In embodiments of the present disclosure, the STA device may be a mobile phone, a tablet computer (or Pad), a computer with wireless transceiver function, a Virtual Reality (VR) device, an Augmented Reality (AR) device, a wireless device in industrial control, a wireless device in self driving, a wireless device in remote medical, a wireless device in a smart grid, a wireless device in transportation safety, a wireless device in a smart city or a wireless device in a smart home, etc.

As an example rather than a limitation, in embodiments of the present disclosure, the STA device may also be a wearable device. The wearable device can also be referred to as wearable intelligent device, which are the general name of the wearable device developed by applying a wearable technology to intelligently design the daily wear, such as glasses, gloves, a watch, clothing and shoes. The wearable device is a portable device that is worn directly on the body or integrated into the user's clothes or accessories. The wearable device is not only a kind of hardware device, but also a kind of device realizing powerful functions through software support, data interaction and cloud interaction. Generalized wearable smart devices include: a device with full functions and large size (such as smart watch or smart glasses), which can implement complete or partial functions without relying on a smart phone; and a device only focusing on a certain disclosure function (such as various smart bracelets and smart jewelries for monitoring physical signs), which need to be used in conjunction with other devices (such as smart phone).

FIG. 1 exemplarily illustrates one AP and two STAs, and optionally the communication system 100 may include a plurality of APs as well as other numbers of STAs, which are not limited by embodiments of the present disclosure.

It should be understood that a device having communication functions in a network/system in embodiments of the present disclosure may be referred to as a communication device. Taking the communication system 100 as shown in FIG. 1 as an example, the communication device may include an AP 110 and a STA 120 which have communication functions and the AP 110 and the STA 120 may be specific devices as described above and will not be repeated herein. The communication device may also include other devices in the communication system 100, such as a network controller, a gateway and other network entities, which are not limited in the embodiments of the present disclosure.

It is to be understood that terms "system" and "network" in the disclosure may usually be exchanged. In the disclosure, the term "and/or" is used for describing an association relationship of associated objects and represents that three relationships may exist. For example, A and/or B may represent three conditions: independent existence of A, existence of both A and B, and independent existence of B.

In addition, character "/" in the disclosure usually represents that previous and next associated objects form an "or" relationship.

It should be understood that the "indication" mentioned in embodiments of the present disclosure may be a direct indication, may be an indirect indication, or may represent that there is an association relationship. For example, A indicates B, may represent that A directly indicates B, e.g., B can be obtained through A, may also represent that A indirectly indicates B, e.g., A indicates C, and B can be obtained through C, may also represent that there is an association relationship between A and B.

Terms used in the embodiments of the present disclosure are used only for explanation of specific embodiments of the present disclosure, and are not intended to limit the present disclosure. Terms "first", "second", "third", "fourth" and the like in the description, the claims and the accompanying drawings of the present disclosure are used to distinguish different objects rather than using to describe a particular order. Furthermore, the terms "include" and "have" and any variations thereof are intended to cover non-exclusive inclusion.

In the description of the embodiments of the disclosure, the term "corresponding to" may represent that there is a direct correspondence or an indirect correspondence relationship between two elements, may also represent that there is an association relationship between the two elements, may also be a relationship in which one element indicates or is indicated by the other element, or one element configures or is configured by the other element, etc.

In embodiments of the present disclosure, "pre-defined" or "pre-configured" may be implemented by pre-storing corresponding codes, tables or other means that may be used to indicate relevant information in devices (e.g., including STA and AP), specific implementations of which are not limited herein. For example, the "pre-defined" can refer to what is defined in "protocol".

In the embodiments of the present disclosure, the "protocol" may refer to standard protocols in the communication field, for example, may include a WiFi protocol and related protocols applied in future WiFi communication systems, which are not limited in the present disclosure.

The "STA" described in the embodiments of the present disclosure may be, in particular, "non-AP STA".

In order to better understand the embodiments of the present disclosure, a TXOP sharing mechanism related to the present disclosure is described.

Figure 2:
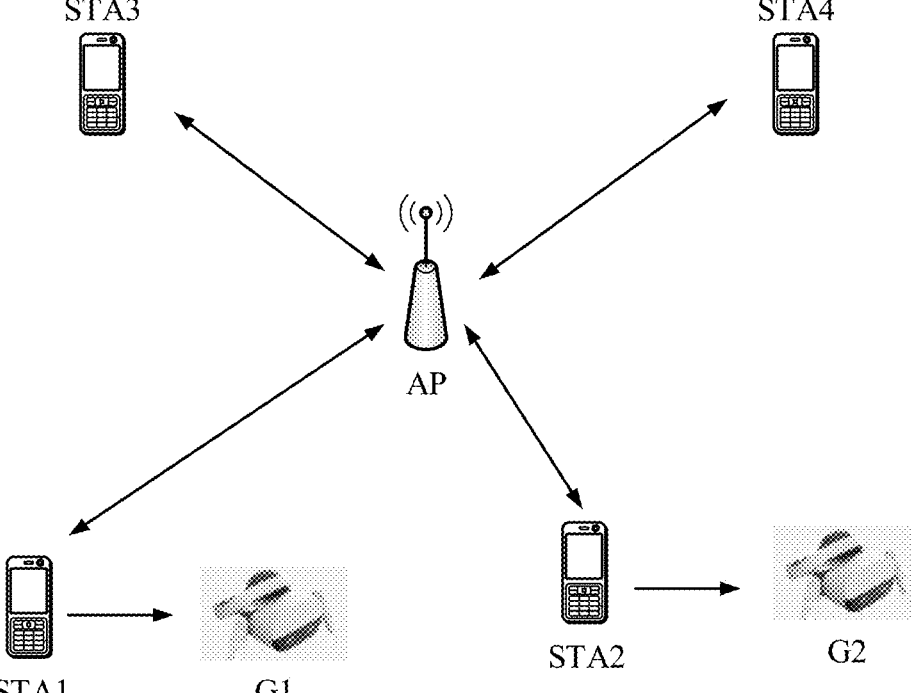
FIG. 2 is a schematic diagram of a scenario that an AP shares TXOP provided by the present disclosure.
Figure 3:
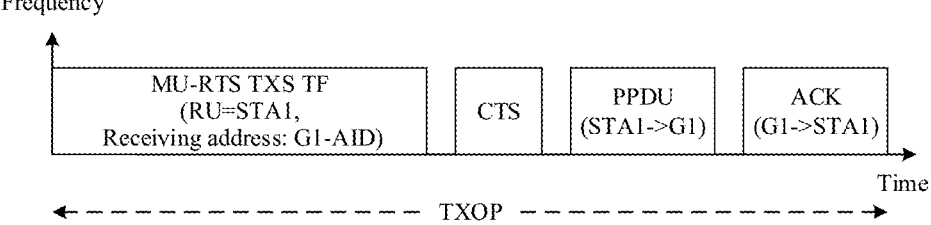
FIG. 3 is a schematic diagram of sharing TXOP to one STA by an AP provided by the present disclosure.

Standard 802.11be proposes a triggered TXOP sharing procedure. As shown in the scenario diagram in FIG. 2, in this mechanism, an AP is allowed to share a part of TXOP obtained by itself to one non-AP STA for use, and this non-AP STA can transmit one or more non-Trigger Based Physical Layer Protocol Data Unit (non-TB PPDU) to its associated AP or to another STA in the shared TXOP. As shown in FIG. 3, the TXOP obtained by the AP can be shared to STA1, for the STA1 to transmit a non-TB PPDU to a Smart glass 1 (G1).

Specifically, as shown in FIG. 3, an AP shares Resource Units (RUs) in a TXOP acquired by the AP to STA1 through a Multiple Users Request-To-Transmit Transmission Opportunity Sharing Trigger Frame (MU-RTS TXS TF). The MU-RTS TXS TF includes one User Info field, and a AID12 subfield in the User Info field is equal to 12 Least Significant Bits (LSB) of an Association Identifier (AID) of the STA1. The MU-RTS TXS TF also indicates time domain resources allocated to the STA1. The STA1 starts using the time domain resources shared by the AP immediately after the AP transmits the MU-RTS TXS TF. Specifically, the STA1 sets a target Reception (RX) address as the AID of the G1, and the STA1 transmits a Clear-To-Send (CTS) frame to the G1, the STA1 transmits a Physical layer protocol data unit (PPDU) to the G1, and the G1 transmits an Acknowledgement (ACK) frame to the STA1.

In order to facilitate a better understanding of the embodiments of the present disclosure, another TXOP sharing mechanism related to the present disclosure is described.

Figure 4:
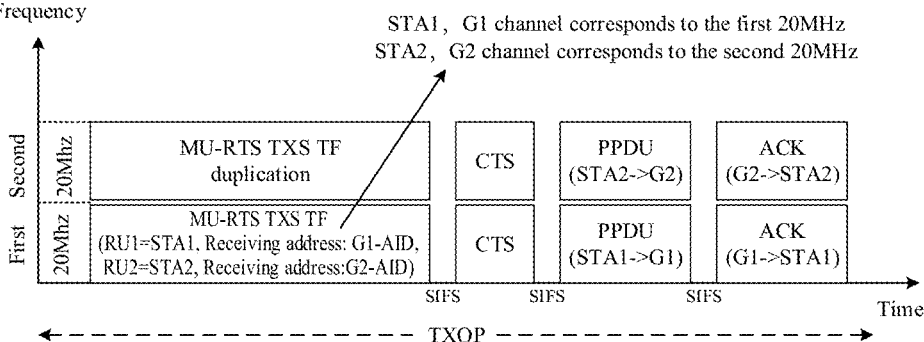
FIG. 4 is a schematic diagram of sharing TXOP to two STAs by an AP provided by the present disclosure.

In this TXOP sharing mechanism, an AP is allowed to share a part of TXOP obtained by itself to a plurality of non-AP STAs for use. As shown in a scenario diagram in FIG. 2, the TXOP obtained by an AP can be shared to STA1 and STA2 for simultaneous use. As shown in FIG. 4, the AP allocates a RU1 to the STA1 for the STA1 to transmit a non-TB PPDU to G1, and allocates a RU2 to the STA2 for the STA2 to transmit a non-TB PPDU to Smart Glass 2 (G2) during the sharing time.

In order to better understand the embodiments of the present disclosure, a method for indicating time domain resources allocated to a non-AP STA under the TXOP sharing mechanism related to the present disclosure is described.

Figure 5:
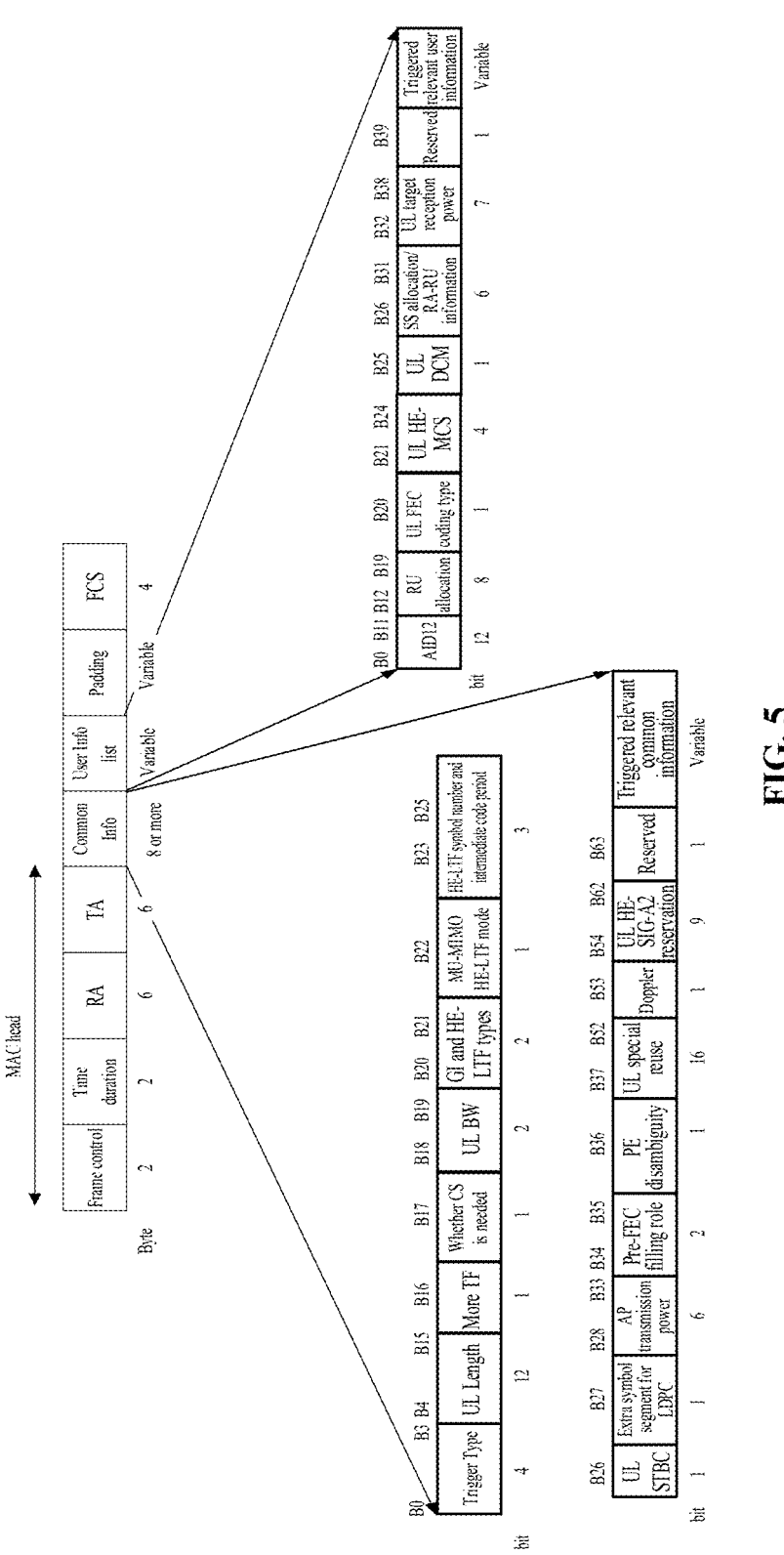
FIG. 5 is a schematic diagram of a MU-RTS TXS TF frame provided by the present disclosure.

FIG. 5 is a format of a MU-RTS TXS TF frame, which includes the following fields.

A Frame control (2 bytes occupied), a time duration (2 bytes occupied), a Receiving Address (RA) (6 bytes occupied), a Transmission Address (TA) (6 bytes occupied), Common Info (8 or more bytes occupied), a User Info list (the number of the occupied bytes is variable), a padding (the number of the occupied bytes is variable), Frame Check Sequence (FCS) (4 bytes occupied).

Herein, the frame control field, the duration field, the RA field and the TA field form a Media Access Control (MAC) head.

As shown in FIG. 5, a Common Info field includes the following subfields.

A Trigger Type (4 bits occupied), a UL Length (12 bits occupied), a more Trigger Frame (TF) (1 bit occupied), whether Carrier Sense (CS) is needed (1 bit occupied), a uplink BandWidth (BW) (2 bits occupied), Guard Interval (GI) and High Efficiency Long Training Field (HE-LTF) types (2 bits occupied), a Multiple Users multiple-in multiple-out, MU-MIMO) HE-LTF mode (1 bit occupied), the number of HE-LTF symbol and an intermediate code period (3 bits occupied), a uplink Space Time Block Code (STBC) (1 bit occupied), an extra symbol segment for low-density parity check (LDPC) (1 bit occupied), an AP transmission power (6 bits occupied), a Pre-Forward Error Correction (Pre-FEC) filling role (2 bits occupied), a Packet Extension (PE) disambiguity (1 bit occupied), a uplink special reuse (16 bits occupied), a Doppler (1 bit occupied), a uplink High Efficiency-SINGAL field-A2 (HE-SIG-A2) reservation (9 bits occupied), reserved (1 bit occupied), and triggered relevant common information (the number of the occupied bits is variable).

As shown in FIG. 5, a User information list field includes the following subfields.

An AID12 (12 bits occupied), a RU allocation (8 bits occupied), a uplink Forward Error Correction (FEC) coding type (1 bit occupied), a uplink High Efficiency Modulation and Coding Scheme (HE-MCS) (4 bits occupied), a uplink Dual Carrier Modulation (DCM) (1 bit occupied), Spatial Stream (SS) allocation information/Random Access Resource Unit (RA-RU) information (6 bits occupied), a uplink target reception power (7 bits occupied), reserved (1 bit occupied), triggered relevant user information (the number of the occupied bits is variable).

Specifically, a manner for indicating allocated time to a non-AP STA is as follows.

Option 1: indicating by using the reserved bits of the User Info field in the User information list field, for example, use 7 reserved bits to indicate ($2^7$) time units, each of which is 128 μs.

Option 2: indicating by using the UL Lengthsubfield of the Common Info field, for example, a total of 12 reserved bits indicate ($2^{12}$) time units, each of which is 4 μs.

It should be noted that the maximum time duration shared by the above two manners is about 16 ms.

For the above TXOP sharing mechanism as shown in FIG. 3, it only supports that an AP shares a part of the acquired TXOP to one STA for use.

For the above TXOP sharing mechanism as shown in FIG. 4, it is proposed that an AP shares a part of the acquired TXOP to a plurality of STAs for simultaneous use, but is designed from a view of allocating different RUs (supported from the frequency domain) to the plurality of non-AP STAs.

For the above method of indicating time domain resources allocated to a non-AP STA under the TXOP sharing mechanism as shown in FIG. 5, it only supports allocating the time domain resources to one non-AP STA.

The above technology does not consider that an AP shares a TXOP obtained by the AP to a plurality of non-AP STAs in a time division manner, and the allocation indication manner of time domain resources shared by the AP is not supported for the plurality of non-AP STAs.

Based on the above technical problems, the present disclosure provides a TXOP sharing solution, in which an AP shares a part of a TXOP obtained by the AP in a time division manner to a plurality of pairs of non-AP STAs for use, and the use mode can be that a non-AP STA transmits a non-TB PPDU to an AP associated with the non-AP STA or that a non-AP STA transmits a non-TB PPDU to another STA.

Specifically, the AP distributes different time domain resources to a plurality of non-AP STAs through a MU-RTS TXS TF frame, for the plurality of the non-AP STAs to transmit non-TB PPDUs. Each non-AP STA synchronously responds a CTS frame to the AP. Each non-AP STA transmits a non-TB PPDU to an AP associated with the non-AP STA or another STA on the allocated time domain resources. The AP associated with the non-AP STA or the another STA responds an ACK to the non-AP STA.

Figure 6:
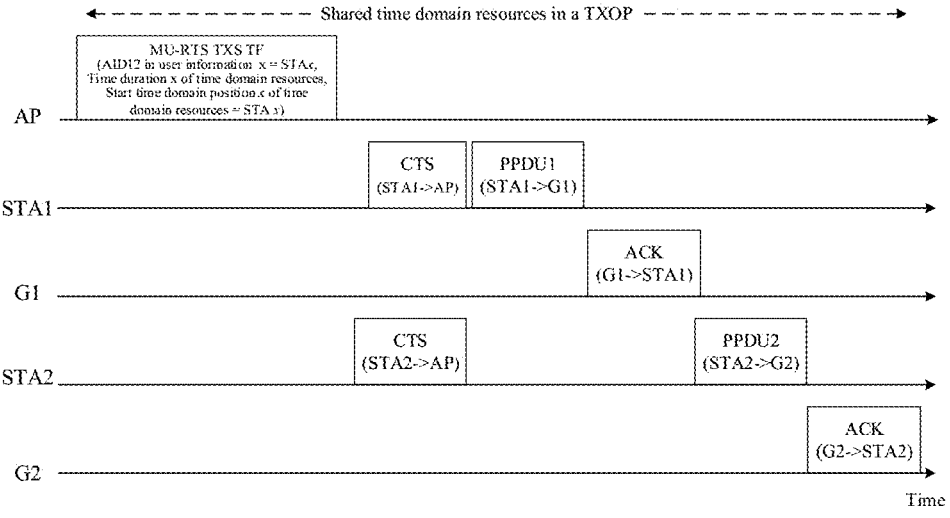
FIG. 6 is a schematic flow diagram of a time division sharing of a TXOP acquired by an AP by multiple users provided according to an embodiment of the present disclosure.

For example, as shown in FIG. 6, an AP shares part or all of time domain resources of a TXOP acquired by the AP to STA1 and STA2, and the STA1 and the STA2 synchronously respond CTS frames to the AP. The STA1 transmits a PPDU1 to a G1 on the allocated time domain resources, and G1 responds an ACK to the STA1. The STA2 transmits a PPDU2 to a G2 on the allocated time domain resources, and the G2 responds an ACK to the STA2.

The technical solution of the present disclosure will be described in detail through specific embodiments below.

Figure 7:
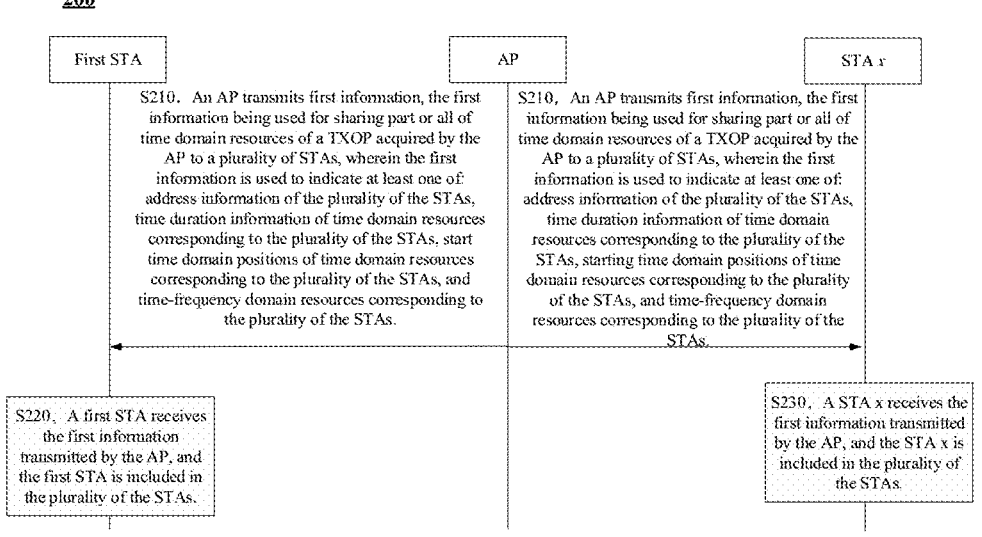
FIG. 7 is a schematic interactive flow diagram of a method for wireless communication provided according to an embodiment of the present disclosure.

FIG. 7 is a schematic interactive diagram of a method 200 for wireless communication according to an embodiment of the present disclosure, as shown in FIG. 7, the method 200 for wireless communication may include at least some of the following:

At S210, An AP transmits first information, the first information being used for sharing part or all of time domain resources of a TXOP acquired by the AP to a plurality of STAs, wherein the first information is used to indicate at least one of: address information of the plurality of the STAs, time duration information of time domain resources corresponding to the plurality of the STAs, start time domain positions of time domain resources corresponding to the plurality of the STAs, and time-frequency domain resources corresponding to the plurality of the STAs.

At S220, a first STA receives the first information transmitted by the AP, and the first STA is included in the plurality of the STAs.

In some embodiments, the method for wireless communication 200 may include the following S230.

S230, a STA x receives the first information transmitted by the AP, and the STA x is included in the plurality of the STAs. That is, the AP can transmit the first information to the plurality of the STAs at the same time.

It should be noted that the first STA may be any one of the plurality of the STAs.

In the embodiment of the present disclosure, the AP can share part or all of the time domain resources of the TXOP acquired by the AP to the plurality of the STAs, and specifically indicate at least one of the address information of the plurality of the STAs, the time duration information of time domain resources corresponding to the plurality of the STAs, the start time domain positions of time domain resources corresponding to the plurality of the STAs, and the time-frequency domain resources corresponding to the plurality of the STAs. Thus, the plurality of the STAs can perform communications based on resources shared by the AP, thereby reducing the communication delay of the STAs.

In some embodiments, the address information of the plurality of the STAs may include 12 least significant bits (LSB) of an AID.

In some embodiments, the first information is transmitted through a first trigger frame. For example, the first trigger frame is a MU-RTS TXS TF. Of course, the first trigger frame may also be another type of trigger frame, which is not limited in the present disclosure.

In some embodiments, the first trigger frame includes a TXOP sharing mode subfield, and the TXOP sharing mode subfield is set to a non-zero value.

For example, the TXOP sharing mode subfield is set to 1 or 2 or 3.

In some embodiments, in a case that the first information is at least used to indicate the address information of the plurality of the STAs, the first trigger frame includes a user information list field, the user information list field includes a plurality of User Info fields corresponding to the plurality of the STAs respectively, and each of the plurality of the User Info fields is used to indicate address information of a corresponding STA.

In some implementations, the address information includes 12 LSBs of an AID, and an AID12 subfield in each of the plurality of the User Info fields is used to indicate the 12 LSBs of the AID of the corresponding STA. For example, the first trigger frame is a MU-RTS TXS TF, and the AID 12 subfield may be shown, for example, in FIG. 8.

Figure 8:
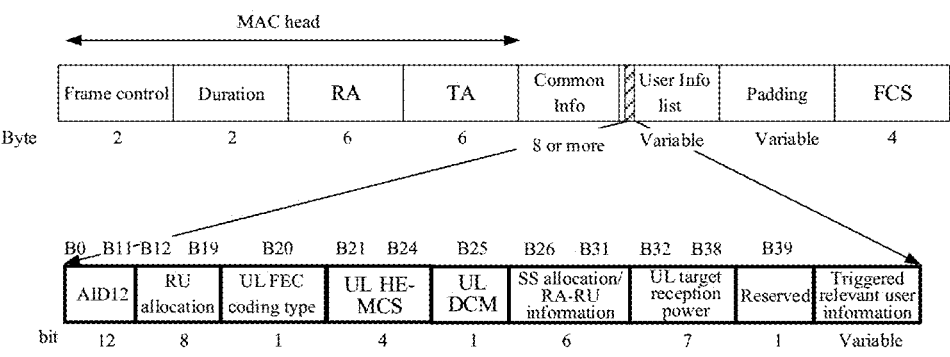
FIG. 8 is a schematic diagram of a User Info field format of a MU-RTS TXS TF frame provided according to an embodiment of the present disclosure.

It should be noted that an AID12 subfield of a User Info field in FIG. 8 is equal to 12 LSBs of a STA AID.

In some embodiments, in a case that the first information is at least used to indicate the time duration information of the time domain resources corresponding to the plurality of the STAs, the first trigger frame includes a user information list field, the user information list field includes a plurality of User Info fields corresponding to the plurality of the STAs respectively, and M reserved bits in each of the plurality of the User Info fields are used to indicate a time duration of time domain resources of a corresponding STA, M is a positive integer.

Figure 9:
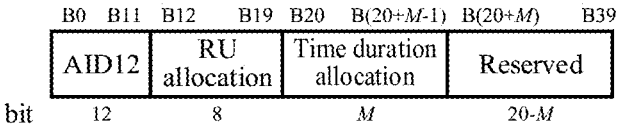
FIG. 9 is a schematic diagram of another User Info field format provided according to an embodiment of the present disclosure.

For example, the first trigger frame is a MU-RTS TXS TF. As shown in FIGS. 9, B20 to B39 (20 bits in total) of the User Info field are reserved bits (or can be used to be redefined), in which M (7 or 12, not limited herein) bits (i.e. M reserved bits) can be used (or be redefined) as an indication (i.e., a time duration allocation subfield in FIG. 9) of a time duration of time domain resources allocated to a corresponding non-AP STA.

In some implementations, the M reserved bits may indicate $2^M$ time units, the time duration is obtained according to the $2^M$ time units, i.e., the M reserved bits are specifically used for indicating the time duration of the time domain resources corresponding to the corresponding STA.

For example, the time unit is 4 μs or 128 μs, and the specific time duration of the time unit is not limited in the present disclosure.

In some embodiments, in a case that the first information is at least used to indicate the time duration information of the time domain resources corresponding to the plurality of the STAs, the first trigger frame includes a Common Info field, a UL length subfield in the Common Info field is used to indicate a total time duration of the time domain resources corresponding to the plurality of the STAs, corresponding time domain resources of each of the plurality of the STAs have a same time duration, and the each of the plurality of the STAs determines a time duration of the corresponding time domain resources from the total time duration of the time domain resources according to its order in the user information list field.

That is, the plurality of the STAs share the total time duration of the time domain resources on average.

In some implementations, in a case that the total time duration of the time domain resources does not includes a Short Inter frame Space (SIFS), the each of the plurality of the STAs determines the time duration of its corresponding time domain resources according to a following formula (1):

$$R_{each} = \frac{R_{total} - (n+1) \times SIFS}{n}. \qquad \text{Formula (1)}$$

$R_{each}$ represents the time duration of the time domain resources corresponding to each of the plurality of the STAs, $R_{total}$ represents the total time duration of the time domain resources, and n represents the number of the plurality of the STAs.

In some implementations, in a case that the total time duration of the time domain resources includes a SIFS, the each of the plurality of the STAs determines the time duration of its corresponding time domain resources according to a following formula (2):

$$R_{each} = \frac{R_{total}}{n}. \qquad \text{Formula (2)}$$

$R_{each}$ represents the time duration of the time domain resources corresponding to each of the plurality of the STAs, $R_{total}$ represents the total time duration of the time domain resources, and n represents the number of the plurality of the STAs.

In some embodiments, in a case that the first information is at least used to indicate the time duration information of the time domain resources corresponding to the plurality of the STAs, the first trigger frame includes a Common Info field, a UL length subfield in the Common Info field is used to indicate time domain resources of a first time duration, each of the plurality of the STAs corresponds to the time domain resources of the first time duration, and the each of the plurality of the STAs determines a time duration of corresponding time domain resources from a total time duration of the time domain resources according to its order in a user information list field.

In some implementations, in a case that the time domain resources of the first time duration do not includes a SIFS, the total time duration of the time domain resources is determined according to a following formula (3):

$$R_{total} = R \times n + (n+1) \times SIFS \qquad \text{Formula (3)}.$$

R represents the time domain resources of the first time duration, $R_{total}$ represents the total time duration of the time domain resources, and n represents the number of the plurality of the STAs.

In some implementations, in a case that the total time duration of the time domain resources includes a SIFS, the total time duration of the time domain resources is determined according to a following formula (4):

$$R_{total} = R \times n \qquad \text{Formula (4)}.$$

R represents the time domain resources of the first time duration, $R_{total}$ represents the total time duration of the time domain resources, and n represents the number of the plurality of the STAs.

In some embodiments, in a case that the first information is at least used to indicate the time duration information of the time domain resources corresponding to the plurality of the STAs, the first trigger frame includes a Common Info field and a user information list field, a UL length subfield in the Common Info field is used to indicate time domain resources of a second time duration, the user information list field includes a plurality of User Info fields corresponding to the plurality of the STAs respectively, at least one reserved bit included in each of the plurality of the User Info fields is used to indicate an offset of a time duration of time domain resources of a corresponding STA, and each of the plurality of the STAs determines the time duration of the time domain resources corresponding to it according to the offset of the time duration of the time domain resource corresponding it and the second time duration of the time domain resource.

In some implementations, the each of the plurality of the STAs determines the time duration of the time domain resources corresponding to it according to a following formula (5):

$$R_i = R + R_{offset\_i} \qquad \text{Formula (5)}.$$

R represents the second time duration of the time domain resources, $R_i$ represents a time duration of time domain resources corresponding to an $i^{th}$ STA in the plurality of the STAs, $R_{offset\_i}$ represents an offset of the time duration of the time domain resources corresponding to the $i^{th}$ STA in the plurality of the STAs.

In some embodiments, in a case that the first information is at least used to indicate the start time domain positions of the time domain resources respectively corresponding to the plurality of the STAs, the first trigger frame includes a user information list field, the user information list field includes a plurality of User Info fields corresponding to the plurality of the STAs respectively, and N reserved bits in each of the plurality of the User Info fields are used to indicate a start time domain position of time domain resources of a corresponding STA, N is a positive integer.

Figure 10:
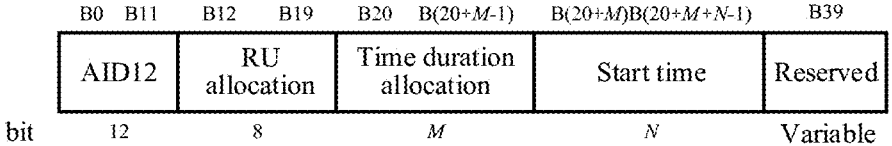
FIG. 10 is a schematic diagram of yet another User Info field format provided according to an embodiment of the present disclosure.

For example, the first trigger frame is a MU-RTS TXS TF. As shown in FIGS. 10, B20 to B39 (20 bits in total) of the User Info field are reserved bits (or can be used to be redefined), M (7 or 12, not limited herein) bits (i.e. the M reserved bits) of them can be used (or be redefined) as an indication (i.e., a time duration allocation subfield in FIG. 10) of a time duration of time domain resources allocated to a corresponding non-AP STA. Furthermore, N (7 or 12, not limited herein) bits (i.e. N reserved bits) can be used (or be redefined) as an indication (i.e., a start time subfield in FIG. 10) of a start time domain position of time domain resources allocated to a corresponding non-AP STA.

It should be noted that in above FIG. 10, the start time of the first non-AP STA can be a termination time of MU-RTS TXS TF transmission, and can also be indicated by using the reserved bits of the User Info field (or multiplexing the bits of the User Info field). Because the time duration allocation subfield for indicating the time duration of the shared time domain resources has occupied M bits of the User Info field, so that M+N≤20.

In some implementations, the N reserved bits may indicate $2^N$ time units, the start time domain position of time domain resources is obtained according to the $2^N$ time units, i.e., the N reserved bits are specifically used for indicating the start time domain position of the time domain resources corresponding to the corresponding STA.

For example, the time unit is 4 μs or 128 μs, and the specific time duration of the time unit is not limited in the present disclosure.

In some embodiments, a start time domain position of time domain resources corresponding to each of the plurality of the STAs is determined according to an order of the plurality of the STAs in a User Info list. That is, each of the plurality of the STAs deduces the start time domain position for using the allocated time domain resources according to its own order in the User Info List by itself.

In some implementations, the time domain resources corresponding to the each of the plurality of the STAs are allocated according to the order of the plurality of the STAs in the User Info list, and/or, the time domain resources corresponding to the plurality of the STAs are continuous. That is, the AP sequentially allocates the time duration of the time domain resources to each of the plurality of the STAs in the order in the User Info List. The time duration of the time domain resources allocated by the AP to the plurality of the STAs is continuous.

In some implementations, each of the plurality of the STAs needs to know its order in the User Info list. In addition, each of the plurality of the STAs needs to know the time duration of the time domain resources allocated to all STAs, which precede it in the User Info list.

In some implementations, the first STA determines the start time domain position of the time domain resources corresponding to the first STA according to the order of the first STA in the User Info list and the time duration information of the time domain resources corresponding to all STAs, which precede the first STA in the User Info list.

In some implementations, the first STA determines the start time domain position of the time domain resources corresponding to the first STA according to the following formula (6):

$$T_s[i] = T_s[1] + \sum_{a=0}^{i-1} T_d[a]. \qquad \text{Formula (6)}$$

Herein, the first STA is the $i^{th}$ STA in the User Info list, $T_s[i]$ represents the start time domain position of the time domain resources corresponding to the first STA, $T_s[1]$ represents a start time domain position of time domain resources corresponding to a first STA in the User Info list, $T_d[a]$ represents a time duration of time domain resources corresponding to the $a^{th}$ STA in the User Info list.

In some implementations, the start time domain position of the time domain resources corresponding to the first STA are the termination time for transmitting the first trigger frame (such as the MU-RTS TXS TF).

In some embodiments, in a case that the first information is at least used to indicate the time-frequency domain resources corresponding to the plurality of the STAs, the first trigger frame includes a user information list field, the user information list field includes a plurality of User Info fields corresponding to the plurality of the STAs, a duration allocation subfield in each of the plurality of the User Info fields is used to indicate time domain resources of a corresponding STA, and a resource unit allocation subfield in the each of the plurality of the User Info fields is used to indicate frequency domain resources of the corresponding STA.

In some embodiments, the first STA can transmit a non-Trigger Based Physical Layer Protocol Data Unit (non-TB PPDU) to the AP on shared time domain resources. Alternatively, the first STA can transmit a non-TB PPDU to another STA on shared time domain resources.

In some embodiments, the first STA releases the time domain resources shared to the first STA in a case that the first STA terminates the time domain resources shared to the first STA in advance. Further, the first STA does not transmit information for instructing the first STA to release the time domain resources shared to the first STA to the AP. That is, the first STA can directly release the time domain resources shared to the first STA without notifying the AP.

In some embodiments, the AP receives second information transmitted by a first STA of the plurality of the STAs, and the second information is used to instruct the first STA to release time domain resources shared to the first STA. That is, in a case that the first STA terminates the time domain resources shared to the first STA in advance, the first STA may indicate the AP that it has released the time domain resources shared to the first STA.

In some implementations, the second information is a TXOP sharing release frame. For example, in a case that the first STA terminates the time domain resources shared to the first STA in advance, the first STA may transmit the TXOP sharing release frame to the AP, which may be shown in FIG. 11. When the AP receives the TXOP sharing release frame transmitted by the first STA, it can be known that the first STA releases the time domain resources shared to the first STA.

In some implementations, the second information is a contention free end (CF-End) frame. When the AP receives the CF-End frame transmitted by the first STA, it can be known that the first STA releases the time domain resources shared to the first STA.

In some implementations, the second information is carried by a TXOP sharing termination subfield in a frame control field of a first PPDU. For example, as shown in FIG. 12, More Data subfield in the frame control field can be defined as the TXOP sharing termination subfield.

Figure 12:
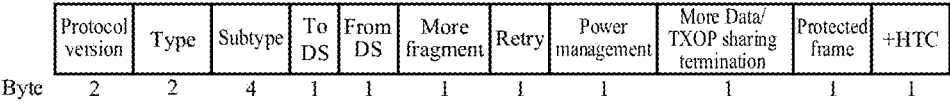
FIG. 12 is a schematic diagram of a TXOP sharing termination subfield provided according to an embodiment of the present disclosure.

Specifically, as shown in FIG. 12, the frame control field may also include the following subfields: protocol version, type, subtype, to distribution system (DS) (to DS), from DS, more fragments, retry, power management, protected frame, High-Throughput Control (HTC). That is, the frame control field is a frame control field having HTC subfield.

For example, the first STA may set a TXOP sharing termination subfield in the frame control field of the first PPDU to 1, to indicate the AP that the first STA has released the shared time domain resources.

In some implementations, the first PPDU is a last PPDU transmitted by the first STA in a case that the first STA transmits a non-TB PPDU to the AP on the shared time domain resources.

In some implementations, the first PPDU is one PPDU transmitted from the first STA to the AP in a case that the first STA transmits a non-TB PPDU to another STA on the shared time domain resources.

In some embodiments, the AP and the plurality of the STAs do not use remaining time domain resources shared by the AP to the first STA. That is, the remaining time domain resources shared to the first STA are idle and not used, and subsequent STAs (i.e., start time domain positions of time domain resources corresponding to the subsequent STAs are after a start time domain position of time domain resources corresponding to the first STA) waits until the time domain resources preset by the MU-RTS TXS TF frame arrives, and then continues to use TXOP time domain resources shared by the AP.

Figure 13:
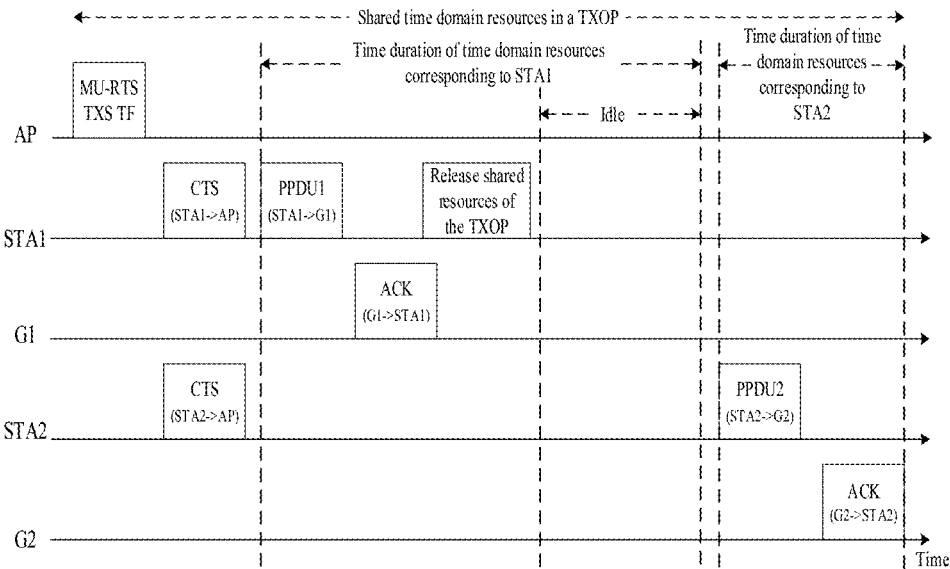
FIG. 13 is a schematic diagram of idle remaining time domain resources provided according to an embodiment of the present disclosure.

For example, as shown in FIG. 13, an AP shares part or all of time domain resources of a TXOP acquired by the AP to STA1 and STA2, and the STA1 and the STA2 synchronously respond CTS frames to the AP. The STA1 transmits a PPDU1 to a G1 on the allocated time domain resources, the G1 responds an ACK to the STA1, and the STA1 releases the time domain resources shared to it. The STA2 transmits a PPDU2 to a G2 on the allocated time domain resources, and the G2 responds an ACK to the STA2. As shown in FIG. 13, the remaining time domain resources shared to the STA1 are idle and not used.

In some implementations, the AP does not feedback information to the first STA after receiving the second information. Alternatively, the AP feeds back an ACK frame to the first STA after receiving the second information.

In some implementations, the first STA does not transmit any frames on the remaining time domain resources shared to it after transmitting the second information.

In some embodiments, the AP transmits frames (such as data frames or management frames, which are not limited herein) to at least one STA using remaining time domain resources shared to the first STA. Subsequent STAs (i.e., start time domain positions of time domain resources corresponding to the subsequent STAs are after a start time domain position of time domain resources corresponding to the first STA) waits until the time domain resources preset by the MU-RTS TXS TF frame arrives, and then continues to use TXOP time domain resources shared by the AP.

In some implementations, the at least one STA does not include the first STA, or the at least one STA includes the first STA.

For example, the at least one STA includes the first STA, and the first STA receives frames transmitted by the AP using the remaining time domain resources shared to the first STA.

In some implementations, the AP transmits the frames to the at least one STA using the remaining time domain resources shared to the first STA from the moment when the AP receives the second information to a start of shared time domain resources allocated to a next STA of the first STA.

Figure 14:
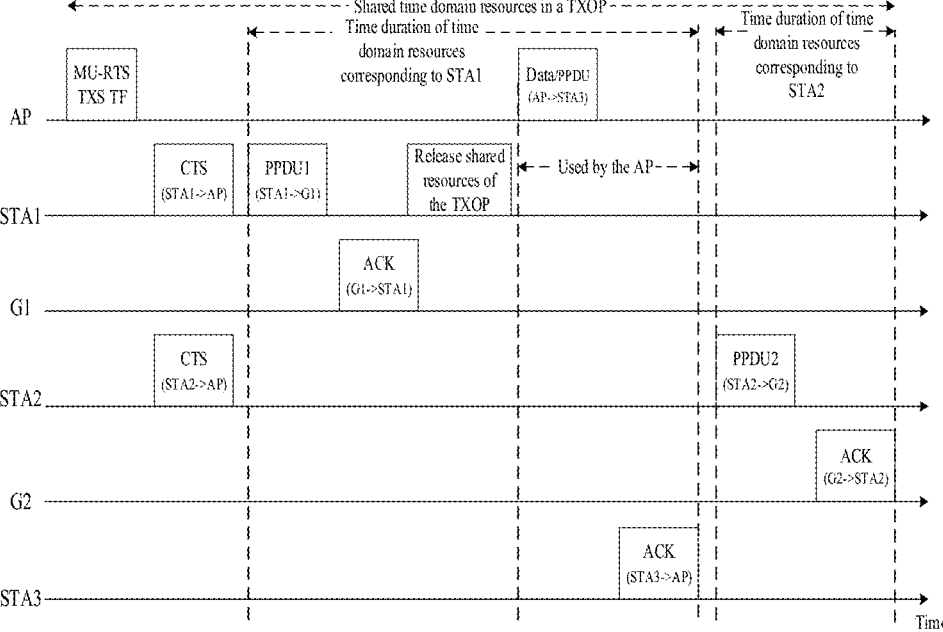
FIG. 14 is a schematic diagram of using remaining time domain resources by an AP according to an embodiment of the present disclosure.

For example, as shown in FIG. 14, an AP shares part or all of time domain resources of a TXOP acquired by the AP to STA1 and STA2, and the STA1 and the STA2 synchronously respond CTS frames to the AP. The STA1 transmits a PPDU1 to a G1 on the allocated time domain resources, the G1 responds an ACK to the STA1, and the STA1 releases the time domain resources shared to it. The STA2 transmits a PPDU2 to a G2 on the allocated time domain resources, and the G2 responds an ACK to the STA2. As shown in FIG. 14, the AP transmits data/PPDU to STA3 using the remaining time domain resources shared to the STA1.

In some implementations, when the AP receives the second information transmitted by the first STA, the AP may initiate a transmission (e.g. may transmit data or other frames to other STAs associated with it) from the current moment until a start of shared time domain resources allocated to a next STA of the first STA.

In some implementations, the first STA does not transmit any frames on the remaining time domain resources shared to it after transmitting the second information.

In some embodiments, the AP transmits third information, and the third information is used to indicate that remaining time domain resources shared to a first STA are shared to at least one STA. For example, the third information is transmitted through a MU-RTS TXS TF.

In some implementations, the AP receives a CTS frame transmitted by the at least one STA. For example, when the AP receives the second information transmitted by the first STA, the AP transmits a MU-RTS TXS TF frame to reallocate time domain resources from the current moment until a start of shared time domain resources allocated to a next STA to at least one STA. When the at least one STA receives the MU-RTS TXS TF frame transmitted by the AP, the at least one STA responds a CTS frame to the AP, and then works according to time domain resources allocated by the MU-RTS TXS TF frame.

In some embodiments, the AP transmits third information, and the third information is used to indicate that all time domain resources from the AP receives second information to the termination of sharing the TXOP are re-shared to at least one STA. For example, the third information is transmitted through a MU-RTS TXS TF.

In some implementations, the AP receives a CTS frame transmitted by the at least one STA. For example, when the AP receives the second information transmitted by the first STA, the AP transmits a MU-RTS TXS TF frame to reallocate all time domain resources from the current time to termination of sharing the TXOP to the at least one STA. When the at least one STA receives the MU-RTS TXS TF frame transmitted by the AP, the at least one STA responds CTS frames to the AP, and then works according to the time domain resources allocated by the MU-RTS TXS TF frame.

Figure 15:
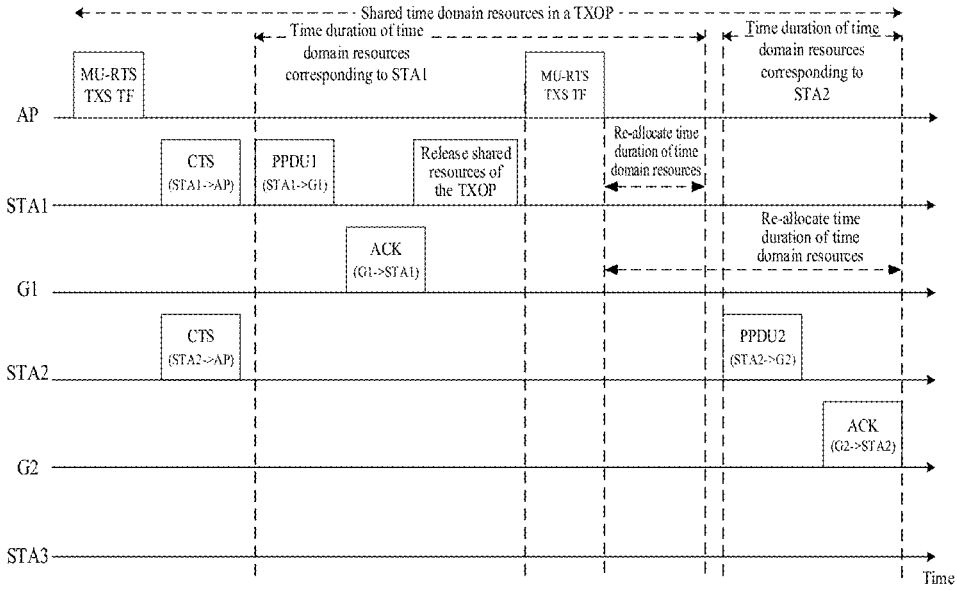
FIG. 15 is a schematic diagram of a reallocation of remaining time domain resources provided according to an embodiment of the present disclosure.

For example, as shown in FIG. 15, an AP shares part or all of time domain resources of a TXOP acquired by the AP to STA1 and STA2, and the STA1 and the STA2 synchronously respond CTS frames to the AP. The STA1 transmits a PPDU1 to a G1 on the allocated time domain resources, the G1 responds an ACK to the STA1, and the STA1 releases the time domain resources shared to it. The STA2 transmits a PPDU2 to a G2 on the allocated time domain resources, and the G2 responds an ACK to the STA2. As shown in FIG. 15, the AP transmits a MU-RTS TXS TF frame using remaining time domain resources shared to the STA1, for example, the MU-RTS TXS TF frame reallocates time domain resources from the current moment to a start of shared time domain resources allocated to a next STA to the at least one STA. For another example, the MU-RTS TXS TF frame re-shares all time domain resources from the current time to termination of sharing the TXOP to the at least one STA.

In some embodiments, the AP transmits fourth information, the fourth information is used to indicate at least one STA in the plurality of the STAs to start using corresponding time domain resources in advance, and start time domain positions of time domain resources corresponding to the at least one STA are after a start time domain position of time domain resources corresponding to the first STA.

In some implementations, the fourth information is transmitted through a Multiple Users Request-To-Transmit Transmission Opportunity Sharing Announce (MU-RTS TXSA) frame.

In some implementations, the MU-RTS TXSA frame is obtained by setting a Guard Interval (GI) and a High Efficiency Long Training Field (HE-LTF) mode subfield in a Multiple Users Request-To-Transmit Trigger Frame (MU-RTS TF) to non-zero values. Alternatively, the MU-RTS TXSA frame is obtained by setting a TXOP sharing mode subfield in a MU-RTS TF to a non-zero value. For example, the non-zero value is 3.

Figure 16:
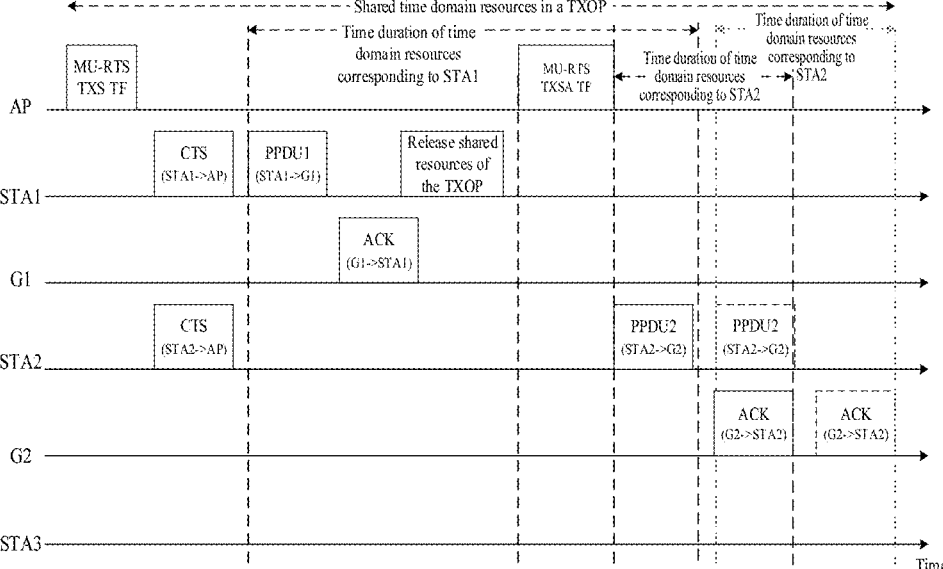
FIG. 16 is a schematic diagram of using time domain resources in advance provided according to an embodiment of the present disclosure.

For example, as shown in FIG. 16, an AP shares part or all of time domain resources of a TXOP acquired by the AP to STA1 and STA2, and the STA1 and the STA2 synchronously respond CTS frames to the AP. The STA1 transmits a PPDU1 to a G1 on the allocated time domain resources, the G1 responds an ACK to the STA1, and the STA1 releases the time domain resources shared to it. As shown in FIG. 16, the AP transmits a MU-RTS TXSA frame using the remaining time domain resources shared to the STA1, the MU-RTS TXSA frame indicates the STA2 to start using the corresponding time domain resources in advance, the STA2 transmits a PPDU2 to a G2 on the allocated time domain resources, and the G2 responds an ACK to the STA2.

Figure 17:
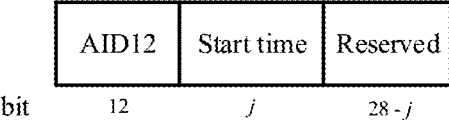
FIG. 17 is a schematic diagram of another User Info field format provided according to an embodiment of the present disclosure.

In some implementations, the MU-RTS TXSA frame includes a start time subfield for indicating a time when the at least one STA starts using the corresponding time domain resources in advance. For example, the MU-RTS TXSA frame includes a User Info field, which may be shown in FIG. 17, the User Info field includes the start time subfield (occupying j bits), and the start time subfield is used to indicate the time when the at least one STA starts using the corresponding time domain resources in advance.

Figure 18:
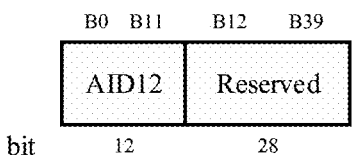
FIG. 18 is a schematic diagram of yet another User Info field format provided according to an embodiment of the present disclosure.

In some implementations, the time when the at least one STA starts using the corresponding time domain resources in advance is a time when a transmission of the MU-RTS TXSA frame terminates. In such a manner, the MU-RTS TXSA frame includes a User Info field, which may be shown in FIG. 18, the User Info field only includes an AID12 subfield and a reserved subfield.

In some implementations, the fourth information is transmitted through a second trigger frame. For example, the second trigger frame is a MU-RTS TXS TF.

In some implementations, configuration parameters of time duration information of the time domain resources corresponding to the at least one STA in the second trigger frame are consistent with that in the first trigger frame, and in the second trigger frame, configuration parameters of the start time domain positions of the time domain resources corresponding to the at least one STA are set as the time when the at least one STA starts using the corresponding time domain resources in advance.

For example, in the second trigger frame, the time duration of the time domain resources allocated to the at least one STA is kept at the same as a value set in the original first trigger frame, and only the indication of the start time domain position of the time domain resources allocated to the at least one STA in the second trigger frame is modified. Then, after receiving the second trigger frame transmitted by the AP, the at least one STA starts to use the allocated time domain resources in advance according to the indication of the start time domain position of the allocated time domain resources, and the time duration for using is indicated by the time duration of the time domain resources in the first trigger frame.

In some implementations, configuration parameters of time duration information of the time domain resources corresponding to the at least one STA in the second trigger frame are null or reserved bits, and configuration parameters of the start time domain positions of the time domain resources corresponding to the at least one STA are set as the time when the at least one STA starts using the corresponding time domain resources in advance in the second trigger frame.

For example, in the second trigger frame, the indication of the time duration of the time domain resources allocated to the at least one STA is set to null/reserved bits, and only the indication of the start time domain position of the time domain resources allocated to the at least one STA in the second trigger frame is modified. Then, after receiving the second trigger frame transmitted by the AP, the at least one STA starts to use the allocated time domain resources in advance according to the indication of the start time domain position of the allocated time domain resources in the second trigger frame, and the time duration for using is equal to the time duration initially configured by the first trigger frame.

Therefore, in the embodiment of the present disclosure, the AP can share part or all of the time domain resources of the TXOP acquired by the AP to the plurality of the STAs for use in a time division manner, and a corresponding resource sharing mechanism and frame structures are provided, thereby reducing the communication delay of the STAs.

Further, the embodiments of the present disclosure provide a solution for indicating the time duration of time domain resources allocated to a plurality of STAs, which can flexibly allocate time domain resources of non-AP STAs participating in sharing a TXOP obtained by an AP. In the future, non-AP STAs with different Quality of Service (QoS) requirements can be allocated with different resources (different time duration), which can improve the QoS of users.

Further, the embodiments of the present disclosure provide a solution for indicating start time domain positions of time domain resources allocated to a plurality of STAs, which can allocate earlier time domain resources to delay-sensitive non-AP STAs, thereby reducing the communication delay of the delay-sensitive non-AP STAs.

Further, the embodiments of the present disclosure provide a solution for reusing remaining time domain resources after non-AP STAs end using time domain resources shared by the AP in advance, which can not only improve the utilization rate of the resources, but also further reduce communication delay of the delay-sensitive non-AP STAs by allocating the remaining time domain resources to the delay-sensitive non-AP STAs.

Further, the embodiments of the disclosure provide a solution that a plurality of STAs share a TXOP obtained by the AP in time domain, which can be combined with the solution of sharing TXOP obtained by the AP in frequency domain, which can further improve the number of non-AP STAs that can participate in sharing the TXOP obtained by the AP, and further reduce the overall delay of the network.

Figure 19:
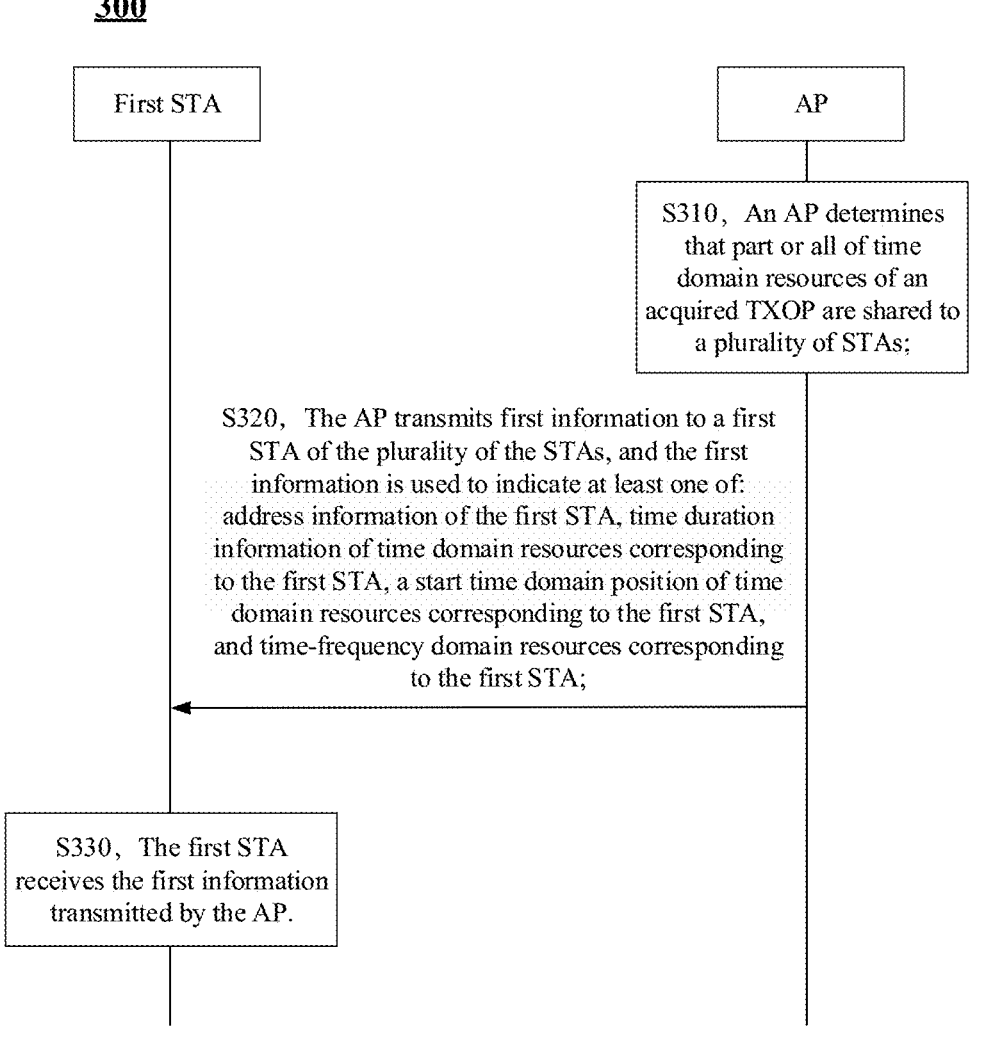
FIG. 19 is a schematic interactive flow diagram of a method for wireless communication provided according to an embodiment of the present disclosure.

FIG. 19 is a schematic interactive diagram of a method 300 for wireless communication according to an embodiment of the present disclosure. As shown in FIG. 19, the method 300 for wireless communication may include at least some of the following:

At S310, an AP determines that part or all of time domain resources of an acquired TXOP are shared to a plurality of STAs.

At S320, The AP transmits first information to a first STA of the plurality of the STAs, and the first information is used to indicate at least one of: address information of the first STA, time duration information of time domain resources corresponding to the first STA, a start time domain position of time domain resources corresponding to the first STA, and time-frequency domain resources corresponding to the first STA.

At S330, the first STA receives the first information transmitted by the AP.

It should be noted that the first STA may be any one of the plurality of the STAs.

In some embodiments, the first information is transmitted through a first trigger frame. For example, the first trigger frame is a MU-RTS TXS TF. Of course, the first trigger frame may also be another type of trigger frame, which is not limited in the present disclosure.

In some embodiments, after time domain resources shared to the first STA terminates, the AP transmits second information to a next STA in the plurality of the STAs, the second information being used to indicate at least one of: address information of the next STA, time duration information of time domain resources corresponding to the next STA, a start time domain position of time domain resources corresponding to the next STA, and time-frequency domain resources corresponding to the next STA.

In some embodiments, the second information is transmitted through a second trigger frame. For example, the second trigger frame is a MU-RTS TXS TF. Of course, the second trigger frame may also be another type of trigger frame, which is not limited in the present disclosure.

In the embodiments of the present disclosure, an AP determines to share part or all of time domain resources of a TXOP acquired by the AP to a plurality of STAs, and the AP allocates one segment of shared time domain resources to one STA of the plurality of the STAs each time by using a MU-RTS TXS TF frame. After the one STA uses up the one segment of the shared time domain resources, the AP allocates another segment of the shared time domain resources to a next STA by using the MU-RTS TXS TF frame. According to such a manner, it also can be implemented that the AP share part or all of the time domain resources of the TXOP acquired by the AP in a time-division manner to the plurality of non-AP STAs.

Figures 20, 21, 22:
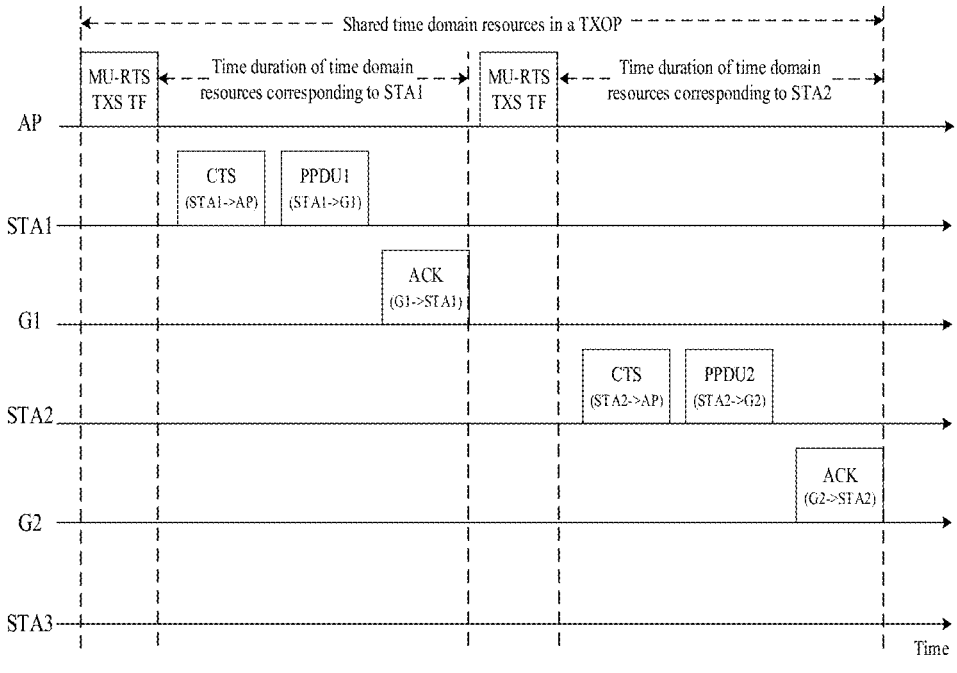
FIG. 20 is a schematic flow diagram of another time division sharing of a TXOP acquired by an AP by multiple users provided according to an embodiment of the present disclosure.
FIG. 21 is a schematic flowchart of a method for wireless communication provided according to an embodiment of the present disclosure.
FIG. 22 is a schematic block diagram of an access point device provided according to an embodiment of the present disclosure.

For example, as shown in FIG. 20, an AP determines to share part or all of time domain resources of a TXOP acquired by the AP to STA1 and STA2. The AP transmits a MU-RTS TXS TF frame to the STA1, to share a segment of time domain resources to the STA1, the STA1 responds a CTS frame to the AP, the STA1 transmits a PPDU1 to a G1 on the allocated time domain resources, and the G1 responds an ACK to the STA1. After the time domain resources shared to the STA1 end, the AP transmits a MU-RTS TXS TF frame to the STA2, to share another segment of time domain resources to the STA2, the STA2 responds a CTS frame to the AP, the STA2 transmits a PPDU2 to a G2 on the allocated time domain resources, and the G2 responds an ACK to the STA2. As shown in FIG. 20, the AP allocates one segment of shared time domain resources to only one non-AP STA once a time, and then allocates another segment of the shared time domain resources to a next non-AP STA after using up the one segment of the shared time domain resources.

In some embodiments, in a case that the first information is at least used to indicate the address information of the first STA, the first trigger frame includes a user information list field, the user information list field includes a User Info field, and the User Info field is used to indicate the address information of the first STA.

In some embodiments, the address information includes 12 LSBs of an AID, and an AID12 subfield in the User Info field is used to indicate the 12 LSBs of the AID of the first STA.

It should be noted that in a case that the first information is at least used to indicate the address information of the first STA, the specific description of the address information of the first STA can refer to the related description in the above-mentioned method 200 for wireless communication, which will not be repeated herein.

In some embodiments, in a case that the first information is at least used to indicate the time duration information of the time domain resources corresponding to the first STA, the first trigger frame includes a user information list field, the user information list field includes a User Info field, M reserved bits in the User Info field are used to indicate a time duration of the time domain resources corresponding to the first STA, and M is a positive integer.

It should be noted that in a case that the first information is at least used to indicate the time duration information of the time domain resources corresponding to the first STA, the specific description of the time duration of the time domain resources corresponding to the first STA can refer to the related description in the above-mentioned method 200 for wireless communication, which will not be repeated herein.

In some embodiments, in a case that the first information is at least used to indicate the start time domain position of the time domain resources corresponding to the first STA, the first trigger frame includes a user information list field, the user information list field includes a User Info field, N reserved bits in the User Info field are used to indicate the start time domain position of the time domain resources of the first STA, and N is a positive integer.

It should be noted that in a case that the first information is at least used to indicate the start time domain position of the time domain resources corresponding to the first STA, the specific description of the start time domain position of the time domain resources corresponding to the first STA can refer to the related description in the above-mentioned method 200 for wireless communication, which will not be repeated herein.

In some embodiments, in a case that the first information is at least used to indicate the time-frequency domain resources respectively corresponding to the first STA, the first trigger frame includes a user information list field, wherein the user information list field includes a User Info field, a duration allocation subfield in the User Info field is used to indicate time domain resources of the first STA, and a resource unit allocation subfield in the User Info field is used to indicate frequency domain resources of the first STA.

It should be noted that in a case that the first information is at least used to indicate the time-frequency domain resources respectively corresponding to the first STA, the specific description of the time-frequency domain resources corresponding to the first STA can refer to the related description in the above-mentioned method 200 for wireless communication, which will not be repeated herein.

In some embodiments, the first trigger frame includes a TXOP sharing mode subfield, and the TXOP sharing mode subfield is set to a non-zero value.

In some embodiments, the first STA transmits a non-TB PPDU to the AP on the shared time domain resources. Alternatively, the first STA transmits a non-TB PPDU to another STA on the shared time domain resources.

In some embodiments, the first STA releases the time domain resources shared to the first STA in a case that the first STA terminates the time domain resources shared to the first STA in advance. Further, the first STA does not transmit information for instructing the first STA to release the time domain resources shared to the first STA to the AP. That is, the first STA can directly release the time domain resources shared to the first STA without notifying the AP. The specific description can refer to the related description in the above-mentioned method 200 for wireless communication, which will not be repeated herein.

In some embodiments, the AP receives third information transmitted by the first STA, and the third information is used to instruct the first STA to release time domain resources shared to the first STA. That is, in a case that the first STA terminates the time domain resources shared to the first STA in advance, the first STA may indicate the AP that it has released the time domain resources shared to the first STA.

In some embodiments, the third information is a TXOP sharing release frame or a CF-End frame. The specific description can refer to the related description in the above-mentioned method 200 for wireless communication, which will not be repeated herein.

In some implementations, the third information is carried by a TXOP sharing termination subfield in a frame control field of a first PPDU.

In some implementations, the first PPDU is a last PPDU transmitted by the first STA in a case that the first STA transmits a non-TB PPDU to the AP on the shared time domain resources.

In some implementations, the first PPDU is one PPDU transmitted from the first STA to the AP in a case that the first STA transmits a non-TB PPDU to another STA on the shared time domain resources.

In some embodiments, the AP and the plurality of the STAs do not use remaining time domain resources shared by the AP to the first STA. That is, the remaining time domain resources shared to the first STA are idle and not used. The specific description can refer to the related description in the above-mentioned method 200 for wireless communication, which will not be repeated herein.

In some implementations, the first STA does not transmit any frames on the remaining time domain resources shared to it after transmitting the third information.

In some embodiments, the AP does not feedback information to the first STA after receiving the third information. Alternatively, the AP feeds back an ACK frame to the first STA after receiving the third information.

In some embodiments, the AP transmits frames to at least one STA using remaining time domain resources shared to the first STA. The specific description can refer to the related description in the above-mentioned method 200 for wireless communication, which will not be repeated herein.

In some embodiments, the at least one STA does not include the first STA, or the at least one STA includes the first STA.

For example, the at least one STA includes the first STA, and the first STA receives frames transmitted by the AP using the remaining time domain resources shared to the first STA.

In some embodiments, the AP transmits fourth information, and the fourth information is used to indicate that remaining time domain resources shared to a first STA are shared to at least one STA. Further, the AP receives CTS frames transmitted by the at least one STA. The specific description can refer to the related description in the above-mentioned method 200 for wireless communication, which will not be repeated herein.

For example, the fourth information is transmitted through a MU-RTS TXS TF.

Therefore, in the embodiment of the present disclosure, the AP can share part or all of the time domain resources of the TXOP acquired by the AP to the plurality of the STAs for use in a time division manner, and a corresponding resource sharing mechanism and frame structures are provided, thereby reducing the communication delay of the STAs.

Further, the embodiments of the present disclosure provide a solution for indicating the time duration of time domain resources allocated to a plurality of STAs, which can flexibly allocate time domain resources to non-AP STAs participating in sharing a TXOP obtained by an AP. In the future, non-AP STAs with different Quality of Service (QoS) requirements can be allocated with different resources (different time duration), which can improve the QoS of users.

Further, the embodiments of the present disclosure provide a solution for indicating start time domain positions of time domain resources allocated to a plurality of STAs, which can allocate earlier time domain resources to delay-sensitive non-AP STAs, thereby reducing the communication delay of the delay-sensitive non-AP STAs.

Further, the embodiments of the present disclosure provide a solution for reusing remaining time domain resources after non-AP STAs end using time domain resources shared by the AP in advance, which can not only improve the utilization rate of the resources, but also further reduce the communication delay of the delay-sensitive non-AP STAs by allocating the remaining time domain resources to the delay-sensitive non-AP STAs.

Further, the embodiments of the disclosure provide a solution that a plurality of STAs share a TXOP obtained by the AP in time domain, which can be combined with the solution of sharing TXOP obtained by the AP in frequency domain, which can further improve the number of non-AP STAs that can participate in sharing the TXOP obtained by the AP, and further reduce the overall delay of the network.

FIG. 21 is a schematic interactive diagram of a method 400 for wireless communication according to an embodiment of the present disclosure. As shown in FIG. 21, the method 400 for wireless communication may include at least some of the following:

At S410, an AP acquires remaining time domain resources shared by the AP to a first STA of a plurality of STAs.

In the embodiment of the present disclosure, the AP can share part or all of the time domain resources of the TXOP acquired by the AP to the plurality of the STAs, and the first STA releases the time domain resources shared to the first STA in a case that the first STA ends time domain resources shared to the first STA in advance.

In some embodiments, the first STA does not use the time domain resources shared to the first STA.

In some embodiments, the first STA does not transmit information for instructing the first STA to release the time domain resources shared to the first STA to the AP. That is, the first STA can directly release the time domain resources shared to the first STA without notifying the AP.

In some embodiments, the AP transmits frames to at least one STA using remaining time domain resources shared to the first STA.

In some embodiments, the at least one STA does not include the first STA, or the at least one STA includes the first STA.

In some embodiments, the AP transmits third information, and the third information is used to indicate that the remaining time domain resources shared to the first STA are re-shared to at least one STA. Alternatively, the third information is used to indicate that all time domain resources from a first time to the termination of sharing the TXOP are re-shared to at least one STA, and the first time is a time when acquiring the remaining time domain resources shared to the first STA.

In some embodiments, the AP receives a CTS frame transmitted by the at least one STA.

In some embodiments, the third information is transmitted through a MU-RTS TXS TF.

In some embodiments, the AP transmits fourth information, the fourth information is used to instruct at least one STA in the plurality of the STAs to start using corresponding time domain resources in advance, and start time domain positions of time domain resources corresponding to the at least one STA are after a start time domain position of time domain resources corresponding to the first STA.

In some embodiments, the fourth information is transmitted through a MU-RTS TXSA frame.

In some embodiments, the MU-RTS TXSA frame is obtained by setting a GI and a value of a HE-LTF mode subfield in a MU-RTS TF to non-zero values, or the MU-RTS TXSA frame is obtained by setting a TXOP sharing mode subfield in a MU-RTS TF to a non-zero value.

In some embodiments, the non-zero value is 3.

In some embodiments, the MU-RTS TXSA frame includes a start time subfield for indicating a time when the at least one STA starts using the corresponding time domain resources in advance.

In some embodiments, the time when the at least one STA starts using the corresponding time domain resources in advance is a time when a transmission of the MU-RTS TXSA frame terminates.

In some embodiments, the fourth information is transmitted through a second trigger frame.

In some embodiments, configuration parameters of time duration information of the time domain resources corresponding to the at least one STA in the second trigger frame is consistent with that in the first trigger frame, and configuration parameters of the start time domain positions of the time domain resources corresponding to the at least one STA are set as the time when the at least one STA starts using the corresponding time domain resources in advance in the second trigger frame.

In some embodiments, configuration parameters of time duration information of the time domain resources corresponding to the at least one STA in the second trigger frame are null or reserved bits, and configuration parameters of the start time domain positions of the time domain resources corresponding to the at least one STA are set as the time when the at least one STA starts using the corresponding time domain resources in advance in the second trigger frame.

In some embodiments, the second trigger frame is a MU-RTS TXS TF.

In some embodiments, the AP and the plurality of the STAs do not use the remaining time domain resources shared by the AP to the first STA.

In some embodiments, the AP receives second information transmitted by the first STA, and the second information is used to instruct the first STA to release time domain resources shared to the first STA. That is, in a case that the first STA terminates the time domain resources shared to the first STA in advance, the first STA may indicate the AP that it has released the time domain resources shared to the first STA.

Figure 11:
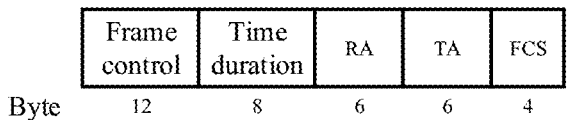
FIG. 11 is a schematic diagram of a TXOP sharing release frame format provided according to an embodiment of the present disclosure.

In some implementations, the second information is a TXOP sharing release frame. For example, in a case that the first STA terminates the time domain resources shared to the first STA in advance, the first STA may transmit the TXOP sharing release frame to the AP. The TXOP sharing release frame may be as shown in FIG. 11. When the AP receives the TXOP sharing release frame transmitted by the first STA, it can be known that the first STA releases the time domain resources shared to the first STA.

In some implementations, the second information is a CF-End frame. When the AP receives the CF-End frame transmitted by the first STA, it can be known that the first STA releases the time domain resources shared to the first STA.

In some embodiments, the second information is carried by a TXOP sharing termination subfield in a frame control field of a first PPDU.

In some implementations, the second information is carried by a TXOP sharing termination subfield in a frame control field of a first PPDU. For example, as shown in FIG. 12, a More Data subfield in the frame control field can be defined as the TXOP sharing termination subfield.

For example, the first STA may set a TXOP sharing termination subfield in the frame control field of the first PPDU to 1, to indicate the AP that the first STA has released the shared time domain resources.

In some implementations, the first PPDU is a last PPDU transmitted by the first STA in a case that the first STA transmits a non-TB PPDU to the AP on the shared time domain resources.

In some implementations, the first PPDU is one PPDU transmitted from the first STA to the AP in a case that the first STA transmits a non-TB PPDU to another STA on the shared time domain resources.

In some embodiments, the AP does not feedback information to the first STA after receiving the second information.

Alternatively, the AP feeds back an ACK frame to the first STA after receiving the second information.

It should be noted that the description of terms in the embodiments of the present disclosure can refer to the related description in the method 200 for wireless communication described above and will not be repeated herein for the sake of brevity.

Therefore, the embodiments of the present disclosure provide a solution for reusing remaining time domain resources after non-AP STAs end using time domain resources shared by the AP in advance, which can not only improve the utilization rate of the resources, but also further reduce the communication delay of the delay-sensitive non-AP STAs by allocating the remaining time domain resources to the delay-sensitive non-AP STAs.

The method embodiments of the present disclosure are described in detail above with reference to FIG. 7 to FIG. 21, and the apparatus embodiments of the present disclosure are described in detail below with reference to FIG. 22 to FIG.

26. It should be understood that the apparatus embodiments and the method embodiments correspond to each other, and similar descriptions may refer to the method embodiments.

FIG. 22 illustrates a schematic block diagram of an access point device 500 according to an embodiment of the present disclosure. As shown in FIG. 22, the access point device 500 includes a communication unit 510.

The communication unit 510 is configured to transmit first information. The first information is used for sharing part or all of time domain resources of a transmission opportunity (TXOP) acquired by the AP to a plurality of stations (STAs), and the first information is used to indicate at least one of: address information of the plurality of the STAs, time duration information of time domain resources correspond-ing to the plurality of the STAs, start time domain positions of time domain resources corresponding to the plurality of the STAs, and time-frequency domain resources correspond-ing to the plurality of the STAs.

In some embodiments, the first information is transmitted through a first trigger frame.

In some embodiments, in a case that the first information is at least used to indicate the address information of the plurality of the STAs, the first trigger frame includes a user information list field, the User information list field includes a plurality of User Info fields corresponding to the plurality of the STAs respectively, and each of the plurality of the User Info fields is used to indicate address information of a corresponding STA.

In some embodiments, the address information includes 12 LSBs of an AID, the each of the plurality of the User Info fields is used to indicate the address information of the corresponding STA includes: an AID12 subfield in each of the plurality of the User Info fields is used to indicate the 12 LSBs of the AID of the corresponding STA.

In some embodiments, in a case that the first information is at least used to indicate the time duration information of the time domain resources corresponding to the plurality of the STAs, the first trigger frame includes a user information list field, the user information list field includes a plurality of User Info fields corresponding to the plurality of the STAs respectively, and M reserved bits in each of the plurality of the User Info fields are used to indicate a time duration of time domain resources of a corresponding STA, M is a positive integer.

In some embodiments, in a case that the first information is at least used to indicate the time duration information of the time domain resources corresponding to the plurality of the STAs, the first trigger frame includes a Common Info field, a UL length subfield in the Common Info field is used to indicate a total time duration of the time domain resources corresponding to the plurality of the STAs, time domain resources corresponding to each of the plurality of the STAs have a same time duration, and the each of the plurality of the STAs determines a time duration of corresponding time domain resources from the total time duration of the time domain resources according to its order in the user infor-mation list field.

In some embodiments, in a case that the total time duration of the time domain resources does not includes a SIFS, the each of the plurality of the STAs determines the time duration of its corresponding time domain resources according to a following formula:

$$R_{each} = \frac{R_{total} - (n+1) \times SIFS}{n}.$$

$R_{each}$ represents the time duration of the time domain resources corresponding to each of the plurality of the STAs, $R_{total}$ represents the total time duration of the time domain resources, and n represents the number of the plurality of the STAs.

In some embodiments, in a case that the total time duration of the time domain resources includes a SIFS, the each of the plurality of the STAs determines the time duration of its corresponding time domain resources according to a following formula:

$$R_{each} = \frac{R_{total}}{n}.$$

$R_{each}$ represents the time duration of the time domain resources corresponding to each of the plurality of the STAs, $R_{total}$ represents the total time duration of the time domain resources, and n represents the number of the plurality of the STAs.

In some embodiments, in a case that the first information is at least used to indicate the time duration information of the time domain resources corresponding to the plurality of the STAs, the first trigger frame includes a Common Info field, a UL length subfield in the Common Info field is used to indicate time domain resources of a first time duration, all of the plurality of the STAs correspond to the time domain resources of the first time duration, and the each of the plurality of the STAs determines a time duration of corresponding time domain resources from a total time duration of the time domain resources according to its order in a user information list field.

In some embodiments, in a case that the time domain resources of the first time duration do not includes a SIFS, the total time duration of the time domain resources is determined according to a following formula:

$$R_{total}R \times n + (n+1) \times SIFS.$$

R represents the time domain resources of the first time duration, $R_{total}$ represents the total time duration of the time domain resources, and n represents the number of the plurality of the STAs.

In some embodiments, in a case that the time domain resources of the first time duration includes a SIFS, the total time duration of the time domain resources is determined according to a following formula:

$$R_{total}R \times n$$

R represents the time domain resources of the first time duration, $R_{total}$ represents the total time duration of the time domain resources, and n represents the number of the plurality of the STAs.

In some embodiments, in a case that the first information is at least used to indicate the time duration information of the time domain resources corresponding to the plurality of the STAs, the first trigger frame includes a Common Info field and a user information list field.

A UL length subfield in the Common Info field is used to indicate time domain resources of a second time duration, the user information list field includes a plurality of User Info fields corresponding to the plurality of the STAs respectively, at least one reserved bit included in each of the plurality of the User Info fields is used to indicate an offset of a time duration of time domain resources of a corresponding STA, and each of the plurality of the STAs determines the time duration of the corresponding time domain resources according to the offset of the time duration of its corresponding time domain resources and the time domain resources of the second time duration.

In some embodiments, the each of the plurality of the STAs determines the time duration of the corresponding time domain resources according to the offset of the time duration of its corresponding time domain resource and the time domain resources of the second time duration includes: the each of the plurality of the STAs determines the corresponding time duration of the time domain resources according to a following formula:

$$R_i = R + R_{offset\_i}.$$

R represents the time domain resources of the second time duration, $R_i$ represents a time duration of time domain resources corresponding to an $i^{th}$ STA in the plurality of the STAs, $R_{offset\_i}$ represents an offset of the time duration of the time domain resources corresponding to the $i^{th}$ STA in the plurality of the STAs.

In some embodiments, in a case that the first information is at least used to indicate the start time domain positions of the time domain resources respectively corresponding to the plurality of the STAs, the first trigger frame includes a user information list field, the user information list field includes a plurality of User Info fields corresponding to the plurality of the STAs respectively, and N reserved bits in each of the plurality of the User Info fields are used to indicate a start time domain position of time domain resources of a corresponding STA, N is a positive integer.

In some embodiments, in a case that the first information is at least used to indicate the time-frequency domain resources respectively corresponding to the plurality of the STAs, the first trigger frame includes a user information list field, the user information list field includes a plurality of User Info fields corresponding to the plurality of the STAs, a duration allocation subfield in each of the plurality of the User Info fields is used to indicate time domain resources of a corresponding STA, and a resource unit allocation subfield in the each of the plurality of the User Info fields is used to indicate frequency domain resources of the corresponding STA.

In some embodiments, the first trigger frame includes a TXOP sharing mode subfield, and the TXOP sharing mode subfield is set to a non-zero value.

In some embodiments, the first trigger frame is a MU-RTS TXS TF.

In some embodiments, a start time domain position of time domain resources corresponding to each of the plurality of the STAs is determined according to an order of the plurality of the STAs in a User Info list.

In some embodiments, the time domain resources corresponding to the each of the plurality of the STAs is allocated according to the order of the plurality of the STAs in the User Info list, and/or, the time domain resources corresponding to the plurality of the STAs are continuous.

In some embodiments, the communication unit 510 is further configured to receive second information transmitted by a first STA of the plurality of the STAs, and the second information is used to instruct the first STA to release time domain resources shared to the first STA.

In some embodiments, the second information is a TXOP sharing release frame or a CF-End frame.

In some embodiments, the second information is carried by a TXOP sharing termination subfield in a frame control field of a first PPDU.

In some embodiments, the AP and the plurality of the STAs do not use remaining time domain resources shared by the AP to the first STA.

In some embodiments, the communication unit 510 is further configured to: not feedback information to the first STA after receiving the second information, or, feeds back an ACK frame to the first STA after receiving the second information.

In some embodiments, the communication unit 510 is further configured to transmit frames to at least one STA using remaining time domain resources shared to the first STA.

In some embodiments, the at least one STA does not include the first STA, or the at least one STA includes the first STA.

In some embodiments, the communication unit 510 is specifically configured to: transmit the frames to the at least one STA using the remaining time domain resources shared to the first STA after the AP receives the second information until a start of shared time domain resources allocated to a next STA of the first STA.

In some embodiments, the communication unit 510 is further configured to transmit third information.

The third information is used to instruct to share remaining time domain resources shared to a first STA to at least one STA.

Alternatively, the third information is used to indicate that all time domain resources after the AP receives second information until terminating sharing the TXOP are re-shared to at least one STA.

In some embodiments, the communication unit 510 is further configured to receive CTS frames transmitted by the at least one STA.

In some embodiments, the third information is transmitted through a MU-RTS TXS TF.

In some embodiments, the communication unit 510 is further configured to transmit fourth information, the fourth information is used to instruct at least one STA in the plurality of the STAs to start using corresponding time domain resources in advance, and start time domain positions of time domain resources corresponding to the at least one STA are after a start time domain position of time domain resources corresponding to the first STA.

In some embodiments, the fourth information is transmitted through a MU-RTS TXSA frame.

In some embodiments, the MU-RTS TXSA frame is obtained by setting a GI and a HE-LTF mode subfield in a MU-RTS TF to non-zero values. Alternatively, the MU-RTS TXSA frame is obtained by setting a TXOP sharing mode subfield in a MU-RTS TF to a non-zero value.

In some embodiments, the non-zero value is 3.

In some embodiments, the MU-RTS TXSA frame includes a start time subfield for indicating a time when the at least one STA starts using the corresponding time domain resources in advance.

In some embodiments, the time when the at least one STA starts using the corresponding time domain resources in advance is a time when a transmission of the MU-RTS TXSA frame terminates.

In some embodiments, the fourth information is transmitted through a second trigger frame.

In some embodiments, configuration parameters of time duration information of the time domain resources corresponding to the at least one STA in the second trigger frame is consistent with that in the first trigger frame, and configuration parameters of the start time domain positions of the time domain resources corresponding to the at least one STA are set as the time when the at least one STA starts using the corresponding time domain resources in advance in the second trigger frame.

Alternatively, configuration parameters of time duration information of the time domain resources corresponding to the at least one STA in the second trigger frame are null or reserved bits, and configuration parameters of the start time domain positions of the time domain resources corresponding to the at least one STA are set as the time when the at least one STA starts using the corresponding time domain resources in advance in the second trigger frame.

In some embodiments, the second trigger frame is a MU-RTS TXS TF.

In some embodiments, the above communication unit may be a communication interface or a transceiver, or an input/output interface of a communication chip or an on-chip system.

It should be understood that the access point device 500 according to the embodiments of the present disclosure may correspond to the AP in the method embodiments of the present disclosure, and the above and other operations and/or functions of the individual units in the access point device 500 are intended to respectively implement the corresponding flow of the AP in the Method 200 for wireless communication shown in FIG. 7. For the sake of simplicity, it will not be elaborated herein.

Figure 23:
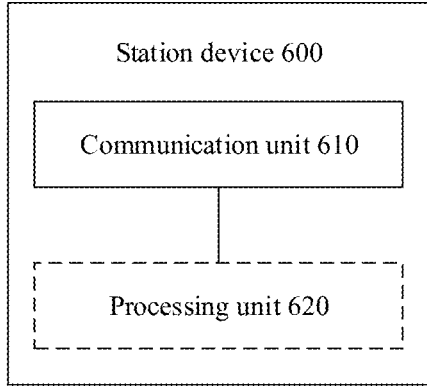
FIG. 23 is a schematic block diagram of a station device provided according to an embodiment of the present disclosure.

FIG. 23 illustrates a schematic block diagram of a station device 600 according to an embodiment of the present disclosure. The station device 600 is a first STA, as shown in FIG. 23, the station device 600 includes a communication unit 610.

The communication unit 610 is configured to receive first information transmitted by an AP, the first information is used to share part or all of time domain resources of a transmission opportunity (TXOP) acquired by the AP to a plurality of STAs, and the plurality of the STAs include the first STA.

The first information is used to indicate at least one of: address information of the plurality of the STAs, time duration information of time domain resources corresponding to the plurality of the STAs, start time domain positions of time domain resources corresponding to the plurality of the STAs, and time-frequency domain resources corresponding to the plurality of the STAs.

In some embodiments, the first information is transmitted through a first trigger frame.

In some embodiments, in a case that the first information is at least used to indicate the address information of the plurality of the STAs, the first trigger frame includes a user information list field, the user information list field includes a plurality of User Info fields corresponding to the plurality of the STAs respectively, and each of the plurality of the User Info fields is used to indicate address information of a corresponding STA.

In some embodiments, the address information includes 12 LSBs of an AID, the each of the plurality of the User Info fields is used to indicate the address information of the corresponding STA includes: an AID12 subfield in each of the plurality of the User Info fields is used to indicate the 12 LSBs of the AID of the corresponding STA.

In some embodiments, in a case that the first information is at least used to indicate the time duration information of the time domain resources corresponding to the plurality of the STAs, the first trigger frame includes a user information list field, the user information list field includes a plurality of User Info fields corresponding to the plurality of the STAs respectively, and M reserved bits in each of the plurality of the User Info fields are used to indicate a time duration of time domain resources of a corresponding STA, M is a positive integer.

In some embodiments, in a case that the first information is at least used to indicate the time duration information of the time domain resources corresponding to the plurality of the STAs, the first trigger frame includes a Common Info field, a UL length subfield in the Common Info field is used to indicate a total time duration of the time domain resources corresponding to the plurality of the STAs, time domain resources corresponding to each of the plurality of the STAs have a same time duration, and the each of the plurality of the STAs determines a time duration of the corresponding time domain resources from the total time duration of the time domain resources according to its order in the user information list field.

In some embodiments, in a case that the total time duration of the time domain resources does not includes a SIFS, the each of the plurality of the STAs determines the time duration of the time domain resources corresponding to it according to a following formula:

$$R_{each} = \frac{R_{total} - (n+1) \times SIFS}{n}.$$

$R_{each}$ represents the time duration of the time domain resources corresponding to each of the plurality of the STAs, $R_{total}$ represents the total time duration of the time domain resources, and n represents number of the plurality of the STAs.

In some embodiments, in a case that the total time duration of the time domain resources includes a SIFS, the each of the plurality of the STAs determines the time duration of the time domain resources corresponding to it according to a following formula:

$$R_{each} = \frac{R_{total}}{n}.$$

$R_{each}$ represents the time duration of the time domain resources corresponding to each of the plurality of the STAs, $R_{total}$ represents the total time duration of the time domain resources, and n represents number of the plurality of the STAs.

In some embodiments, in a case that the first information is at least used to indicate the time duration information of the time domain resources corresponding to the plurality of the STAs, the first trigger frame includes a Common Info field, a UL length subfield in the Common Info field is used to indicate time domain resources of a first time duration, all of the plurality of the STAs correspond to the time domain resources of the first time duration, and the each of the plurality of the STAs determines a time duration of corresponding time domain resources from a total time duration of the time domain resources according to its order in a user information list field.

In some embodiments, in a case that the time domain resources of the first time duration do not includes a SIFS, the total time duration of the time domain resources is determined according to a following formula:

$$R_{total} R \times n + (n+1) \times SIFS.$$

R represents the time domain resources of the first time duration, $R_{total}$ represents the total time duration of the time domain resources, and n represents the number of the plurality of the STAs.

In some embodiments, in a case that the time domain resources of the first time duration includes a SIFS, the total time duration of the time domain resources is determined according to a following formula:

$$R_{total} R \times n$$

R represents the time domain resources of the first time duration, $R_{total}$ represents the total time duration of the time domain resources, and n represents the number of the plurality of the STAs.

In some embodiments, in a case that the first information is at least used to indicate the time duration information of the time domain resources corresponding to the plurality of the STAs, the first trigger frame includes a Common Info field and a user information list field.

A UL length subfield in the Common Info field is used to indicate time domain resources of a second time duration, the user information list field includes a plurality of User Info fields corresponding to the plurality of the STAs respectively, at least one reserved bit included in each of the plurality of the User Info fields is used to indicate an offset of a time duration of time domain resources of a corresponding STA, and each of the plurality of the STAs determines the time duration of the corresponding time domain resources according to the offset of the time duration of the time domain resource corresponding it and the time domain resources of the second time duration.

In some embodiments, the each of the plurality of the STAs determines the time duration of the corresponding time domain resources according to the offset of the time duration of the time domain resource corresponding it and the time domain resources of the second time duration includes: the each of the plurality of the STAs determines the corresponding time duration of the time domain resources according to a following formula:

$$R_i = R + R_{offset\_i}.$$

R represents the time domain resources of the second time duration, $R_i$ represents a time duration of time domain resources corresponding to the $i^{th}$ STA in the plurality of the STAs, $R_{offset\_i}$ represents an offset of the time duration of the time domain resources corresponding to the $i^{th}$ STA in the plurality of the STAs.

In some embodiments, in a case that the first information is at least used to indicate the start time domain positions of the time domain resources respectively corresponding to the plurality of the STAs, the first trigger frame includes a user information list field, the user information list field includes a plurality of User Info fields corresponding to the plurality of the STAs respectively, and N reserved bits in each of the plurality of the User Info fields are used to indicate a start time domain position of time domain resources of a corresponding STA, N is a positive integer.

In some embodiments, in a case that the first information is at least used to indicate the time-frequency domain resources respectively corresponding to the plurality of the STAs, the first trigger frame includes a user information list field, the user information list field includes a plurality of User Info fields corresponding to the plurality of the STAs, a duration allocation subfield in each of the plurality of the User Info fields is used to indicate time domain resources of a corresponding STA, and a resource unit allocation subfield in the each of the plurality of the User Info fields is used to indicate frequency domain resources of the corresponding STA.

In some embodiments, the first trigger frame includes a TXOP sharing mode subfield, and the TXOP sharing mode subfield is set to a non-zero value.

In some embodiments, the first trigger frame is a MU-RTS TXS TF.

In some embodiments, a start time domain position of time domain resources corresponding to each of the plurality of the STAs is determined according to an order of the plurality of the STAs in a User Info list.

In some embodiments, the time domain resources corresponding to the each of the plurality of the STAs is allocated according to the order of the plurality of the STAs in the User Info list, and/or, the time domain resources corresponding to the plurality of the STAs are continuous.

In some embodiments, the station device 600 further includes a processing unit 620.

The processing unit 620 is configured to determine the start time domain position of the time domain resources corresponding to the first STA according to the order of the first STA in the User Info list and the time duration information of the time domain resources corresponding to all STAs in front of the first STA in the User Info list.

In some embodiments, the processing unit 620 is specifically configured to: determine the start time domain position of the time domain resources corresponding to the first STA according to the following formula:

$$T_s[i] = T_s[1] + \sum_{a=0}^{i-1} T_d[a].$$

The first STA is the $i^{th}$ STA in the User Info list, $T_s[i]$ represents the start time domain position of the time domain resources corresponding to the first STA, $T_s[1]$ represents a start time domain position of time domain resources corresponding to the first STA in the User Info list, $T_d[a]$ represents a time duration of time domain resources corresponding to the $a^{th}$ STA in the User Info list.

In some embodiments, the communication unit 610 is further configured to transmit a non-TB PPDU to the AP within shared time domain resources. Alternatively, the communication unit 610 is further configured to transmit a non-TB PPDU to another STA within shared time domain resources.

In some embodiments, the station device 600 further includes a processing unit 620.

The processing unit 620 is configured to release the time domain resources shared to the first STA in a case that the first STA terminates the time domain resources shared to the first STA in advance.

In some embodiments, the station device 600 further includes a processing unit 620.

The processing unit 620 is configured to not transmit information for instruct the first STA to release the time domain resources shared to the first STA to the AP.

In some embodiments, the communication unit 610 is further configured to transmit second information to the AP, and the second information is used to instruct the first STA to release time domain resources shared to the first STA.

In some embodiments, the second information is a TXOP sharing release frame or a CF-End frame.

In some embodiments, the second information is carried by a TXOP sharing termination subfield in a frame control field of a first PPDU.

In some embodiments, the first PPDU is a last PPDU transmitted by the first STA in a case that the first STA transmits a non-TB PPDU to the AP within the shared time domain resources.

Alternatively, the first PPDU is one of PPDUs transmitted from the first STA to the AP in a case that the first STA transmits a non-TB PPDU to another STA within the shared time domain resources.

In some embodiments, the communication unit 610 is further configured to receive frames transmitted by the AP using the remaining time domain resources shared to the first STA.

In some embodiments, the above communication unit may be a communication interface or a transceiver, or an input-output interface of a communication chip or an on-chip system.

It should be understood that the station device 600 according to the embodiments of the present disclosure may correspond to the first STA in the method embodiments of the present disclosure, and the above and other operations and/or functions of the individual units in the station device 600 are intended to respectively implement the corresponding flow of the first STA in the Method 200 for wireless communication shown in FIG. 7. For the sake of simplicity, it will not be elaborated herein.

Figure 24:
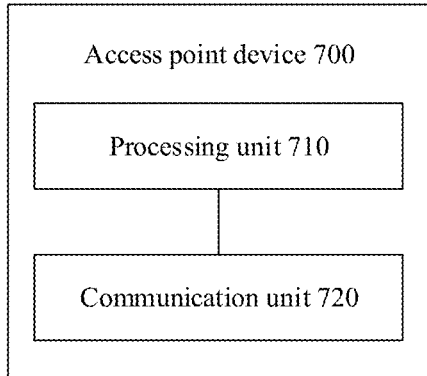
FIG. 24 is a schematic block diagram of another access point device provided according to an embodiment of the present disclosure.

FIG. 24 illustrates a schematic block diagram of an access point device 700 according to an embodiment of the present disclosure. As shown in FIG. 24, the access point device 700 includes a processing unit 710 and a communication unit 720.

The processing unit 710 is configured to determine that part or all of time domain resources of an acquired TXOP are shared to a plurality of STAs;

The communication unit 720 is configured to transmit first information to a first STA of the plurality of the STAs, the first information being used to indicate at least one of: address information of the first STA, time duration information of time domain resources corresponding to the first STA, a start time domain position of time domain resources corresponding to the first STA, and time-frequency domain resources corresponding to the first STA.

In some embodiments, after time domain resources shared to the first STA terminates, the communication unit 720 is further configured to transmit second information to a next STA in the plurality of the STAs, the second information being used to indicate at least one of: address information of the next STA, time duration information of time domain resources corresponding to the next STA, a start time domain position of time domain resources corresponding to the next STA, and time-frequency domain resources corresponding to the next STA.

In some embodiments, the first information is transmitted through a first trigger frame.

In some embodiments, in a case that the first information is at least used to indicate the address information of the first STA, the first trigger frame includes a user information list field, the user information list field includes a User Info field, and the User Info field is used to indicate the address information of the first STA.

In some embodiments, the address information includes 12 LSBs of an AID, the User Info field is used to indicate the address information of the first STA includes: an AID12 subfield in the User Info field is used to indicate the 12 LSBs of the AID of the first STA.

In some embodiments, in a case that the first information is at least used to indicate the time duration information of the time domain resources corresponding to the first STA, the first trigger frame includes a user information list field, the user information list field includes a User Info field, M reserved bits in the User Info field are used to indicate a time duration of the time domain resources corresponding to the first STA, and M is a positive integer.

In some embodiments, in a case that the first information is at least used to indicate the start time domain position of the time domain resources corresponding to the first STA, the first trigger frame includes a user information list field, the user information list field includes a User Info field, N reserved bits in the User Info field are used to indicate the start time domain position of the time domain resources of the first STA, and N is a positive integer.

In some embodiments, in a case that the first information is at least used to indicate the time-frequency domain resources respectively corresponding to the first STA, the first trigger frame includes a user information list field, the user information list field includes a User Info field, a duration allocation subfield in the User Info field is used to indicate time domain resources of the first STA, and a resource unit allocation subfield in the User Info field is used to indicate frequency domain resources of the first STA.

In some embodiments, the first trigger frame includes a TXOP sharing mode subfield, and the TXOP sharing mode subfield is set to a non-zero value.

In some embodiments, the first trigger frame is a MU-RTS TXS TF.

In some embodiments, the AP receives third information transmitted by the first STA, and the third information is used to instruct the first STA to release time domain resources shared to the first STA.

In some embodiments, the third information is a TXOP sharing release frame or a CF-End frame.

In some embodiments, the third information is carried by a TXOP sharing termination subfield in a frame control field of a first PPDU.

In some embodiments, the AP and the plurality of the STAs do not use remaining time domain resources shared by the AP to the first STA.

In some embodiments, the communication unit 720 is further configured to: not feedback information to the first STA after receiving the third information, or, feedback an ACK frame to the first STA after receiving the third information.

In some embodiments, the communication unit 720 is further configured to transmit frames to at least one STA using remaining time domain resources shared to the first STA.

In some embodiments, the at least one STA does not include the first STA, or the at least one STA includes the first STA.

In some embodiments, the communication unit 720 is further configured to transmit fourth information.

The fourth information is used to indicate that remaining time domain resources shared to a first STA are shared to at least one STA.

In some embodiments, the communication unit 720 is further configured to receive a CTS frame transmitted by the at least one STA.

In some embodiments, the fourth information is transmitted through a MU-RTS TXS TF.

In some embodiments, the above communication unit may be a communication interface or a transceiver, or an input-output interface of a communication chip or an on-chip system. The above processing unit may be one or more processor.

It should be understood that the access point device 700 according to the embodiments of the present disclosure may correspond to the AP in the method embodiments of the present disclosure, and the above and other operations and/or functions of the individual units in the access point device 700 are intended to respectively implement the corresponding flow of the AP in the method 300 for wireless communication shown in FIG. 19. For the sake of simplicity, it will not be elaborated herein.

Figure 25:
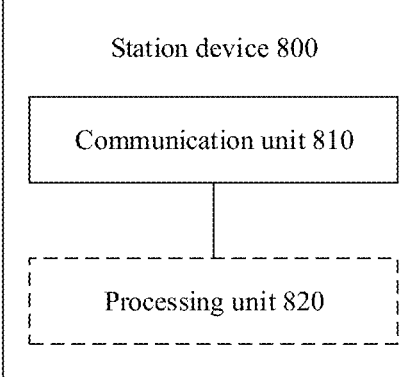
FIG. 25 is a schematic block diagram of yet another station device provided according to an embodiment of the present disclosure.

FIG. 25 illustrates a schematic block diagram of a station device 800 according to an embodiment of the present disclosure. The station device 800 is a first STA, as shown in FIG. 25, the station device 800 includes a communication unit 810.

The communication unit 810 is configured to receive first information transmitted by an AP, the first STA belongs to a plurality of STAs, the plurality of the STAs are STAs sharing part or all of time domain resources of a TXOP acquired by the AP, and the first information is used to indicate at least one of: address information of the first STA, time duration information of time domain resources corresponding to the first STA, a start time domain position of time domain resources corresponding to the first STA, and time-frequency domain resources corresponding to the first STA.

In some embodiments, the first information is transmitted through a first trigger frame.

In some embodiments, in a case that the first information is at least used to indicate the address information of the first STA, the first trigger frame includes a user information list field, the user information list field includes a User Info field, and the User Info field is used to indicate the address information of the first STA.

In some embodiments, the address information includes 12 LSBs of an AID, the User Info field is used to indicate the address information of the first STA includes: an AID12 subfield in the User Info field is used to indicate the 12 LSBs of the AID of the first STA.

In some embodiments, in a case that the first information is at least used to indicate the time duration information of the time domain resources corresponding to the first STA, the first trigger frame includes a user information list field, the user information list field includes a User Info field, M reserved bits in the User Info field are used to indicate a time duration of the time domain resources corresponding to the first STA, and M is a positive integer.

In some embodiments, in a case that the first information is at least used to indicate the start time domain position of the time domain resources corresponding to the first STA, the first trigger frame includes a user information list field, the user information list field includes a User Info field, N reserved bits in the User Info field are used to indicate the start time domain position of the time domain resources of the first STA, and N is a positive integer.

In some embodiments, in a case that the first information is at least used to indicate the time-frequency domain resources respectively corresponding to the first STA, the first trigger frame includes a user information list field, the user information list field includes a User Info field, a duration allocation subfield in the User Info field is used to indicate time domain resources of the first STA, and a resource unit allocation subfield in the User Info field is used to indicate frequency domain resources of the first STA.

In some embodiments, the first trigger frame includes a TXOP sharing mode subfield, and the TXOP sharing mode subfield is set to a non-zero value.

In some embodiments, the first trigger frame is a MU-RTS TXS TF.

In some embodiments, the communication unit 810 is further configured to transmit a non-TB PPDU to the AP tihin shared time domain resources. Alternatively, the communication unit 810 is further configured to transmit a non-TB PPDU to another STA within shared time domain resources.

In some embodiments, the station device 800 further includes a processing unit 820.

The processing unit 820 is configured to release the time domain resources shared to the first STA in a case that the first STA terminates the time domain resources shared to the first STA in advance.

The communication unit 810 is configured to not transmit information for instruct the first STA to release the time domain resources shared to the first STA to the AP.

In some embodiments, the communication unit 810 is further configured to transmit third information to the AP, and the third information is used to instruct the first STA to release time domain resources shared to the first STA.

In some embodiments, the third information is a TXOP sharing release frame or a CF-End frame.

In some embodiments, the third information is carried by a TXOP sharing termination subfield in a frame control field of a first PPDU.

In some embodiments, the first PPDU is a last PPDU transmitted by the first STA in a case that the first STA transmits a non-TB PPDU to the AP within the shared time domain resources.

Alternatively, the first PPDU is one PPDU transmitted from the first STA to the AP in a case that the first STA transmits a non-TB PPDU to another STA within the shared time domain resources.

In some embodiments, the communication unit 810 is further configured to receive frames transmitted by the AP using the remaining time domain resources shared to the first STA.

In some embodiments, the above communication unit may be a communication interface or a transceiver, or an input-output interface of a communication chip or an on-chip system. The above processing unit may be one or more processor.

It should be understood that the station device 800 according to the embodiments of the present disclosure may correspond to the first STA in the method embodiments of the present disclosure, and the above and other operations and/or functions of the individual units in the station device 800 are intended to respectively implement the corresponding flow of the first STA in the method 300 for wireless communication shown in FIG. 19. For the sake of simplicity, it will not be elaborated herein.

Figure 26:
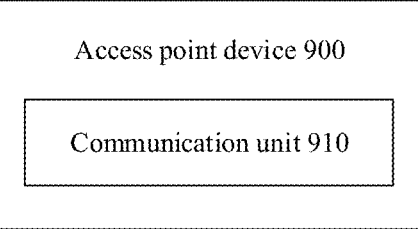
FIG. 26 is a schematic block diagram of another access point device provided according to an embodiment of the present disclosure.

FIG. 26 illustrates a schematic block diagram of an access point device 900 according to an embodiment of the present disclosure. As shown in FIG. 26, the access point device 900 includes a communication unit 910.

The communication unit 910 is configured to acquire remaining time domain resources shared by the AP to a first STA of a plurality of STAs.

In some embodiments, the communication unit 910 is further configured to transmit frames to at least one STA using remaining time domain resources shared to the first STA.

In some embodiments, the at least one STA does not include the first STA, or the at least one STA includes the first STA.

In some embodiments, the communication unit 910 is further configured to transmit third information, and the third information is used to indicate that the remaining time domain resources shared to the first STA are re-shared to at least one STA. Alternatively, the third information is used to indicate that all time domain resources from a first time to termination of sharing the TXOP are re-shared to at least one STA, and the first time is a time when acquiring the remaining time domain resources shared to the first STA.

In some embodiments, the communication unit 910 is further configured to receive a CTS frame transmitted by the at least one STA.

In some embodiments, the third information is transmitted through a MU-RTS TXS TF.

In some embodiments, the communication unit 910 is further configured to transmit fourth information, the fourth information is used to instruct at least one STA in the plurality of the STAs to start using corresponding time domain resources in advance, and start time domain positions of time domain resources corresponding to the at least one STA are after a start time domain position of time domain resources corresponding to the first STA.

In some embodiments, the fourth information is transmitted through a MU-RTS TXSA frame.

In some embodiments, the MU-RTS TXSA frame is obtained by setting a GI and a HE-LTF mode subfield in a MU-RTS TF to non-zero values, or the MU-RTS TXSA frame is obtained by setting a TXOP sharing mode subfield in a MU-RTS TF to a non-zero value.

In some embodiments, the non-zero value is 3.

In some embodiments, the MU-RTS TXSA frame includes a start time subfield for indicating a time when the at least one STA starts using the corresponding time domain resources in advance.

In some embodiments, the time when the at least one STA starts using the corresponding time domain resources in advance is a time when a transmission of the MU-RTS TXSA frame terminates.

In some embodiments, the fourth information is transmitted through a second trigger frame.

In some embodiments, configuration parameters of time duration information of the time domain resources corresponding to the at least one STA in the second trigger frame is consistent with that in the first trigger frame, and configuration parameters of the start time domain positions of the time domain resources corresponding to the at least one STA are set as the time when the at least one STA starts using the corresponding time domain resources in advance in the second trigger frame.

Alternatively, configuration parameters of time duration information of the time domain resources corresponding to the at least one STA in the second trigger frame are null or reserved bits, and configuration parameters of the start time domain positions of the time domain resources corresponding to the at least one STA are set as the time when the at least one STA starts using the corresponding time domain resources in advance in the second trigger frame.

In some embodiments, the second trigger frame is a MU-RTS TXS TF.

In some embodiments, the AP and the plurality of the STAs do not use the remaining time domain resources shared by the AP to the first STA.

In some embodiments, the communication unit 910 is specifically configured to: receive second information transmitted by the first STA, and the second information is used to instruct the first STA to release time domain resources shared to the first STA.

In some embodiments, the second information is a TXOP sharing release frame or a CF-End frame.

In some embodiments, the second information is carried by a TXOP sharing termination subfield in a frame control field of a first PPDU.

In some embodiments, the communication unit 910 is further configured to not feedback information to the first STA after receiving the second information. Alternatively, the communication unit 910 is further configured to feedback an ACK frame to the first STA after receiving the second information.

Figure 27:
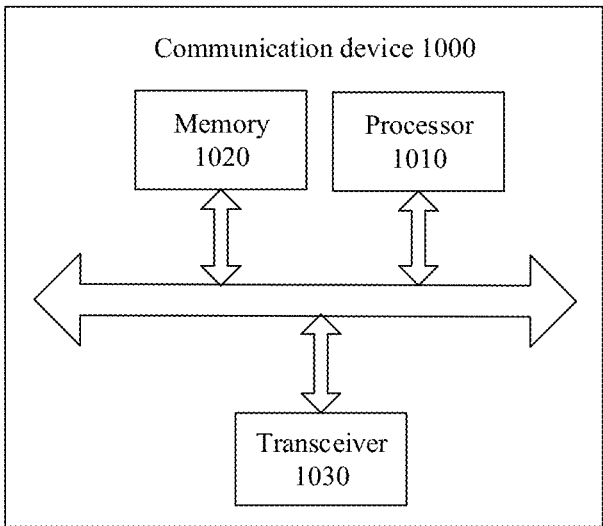
FIG. 27 is a schematic block diagram of a communication device provided according to an embodiment of the present disclosure.

FIG. 27 is a schematic structural diagram of a communication device 1000 according to an embodiment of the present disclosure, the communication device 1000 shown in FIG. 27 includes a processor 1010 that can call and run a computer program from a memory to implement the method in embodiments of the present disclosure.

In some embodiments, as shown in FIG. 27, the communication device 1000 may further include a memory 1020. The processor 1010 may call and run a computer program from the memory 1020 to implement the method in embodiments of the present disclosure.

The memory 1020 may be a separate device independent of the processor 1010 or may be integrated in the processor 1010.

In some embodiments, as shown in FIG. 27, the communication device 1000 may further include a transceiver 1030. The processor 1010 may control the transceiver 1030 to communicate with other devices. Specifically, the transceiver 1030 may transmit information or data to other devices or receive information or data transmitted by other devices.

The transceiver 1030 may include a transmitter and a receiver. The transceiver 1030 may further include antennas, and the number of the antennas may be one or more.

In some embodiments, the communication device 1000 can be the access point device of the embodiments of the present disclosure, and the communication device 1000 can implement corresponding processes implemented by the AP in the various methods according to the embodiments of the present disclosure. For the sake of simplicity, it will not be elaborated herein.

In some embodiments, the communication device 1000 can be a station device according to the embodiments of the present disclosure, and the communication device 1000 can implement corresponding processes implemented by the first STA in the various methods according to the embodiments of the present disclosure. For the sake of brevity, it will not be elaborated herein.

Figure 28:
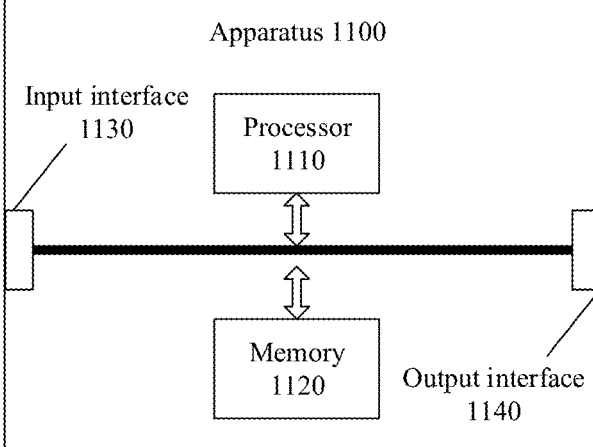
FIG. 28 is a schematic block diagram of an apparatus provided according to an embodiment of the present disclosure.

FIG. 28 is a schematic structural diagram of an apparatus 1100 according to an embodiment of the present disclosure. The apparatus 1100 shown in FIG. 28 includes a processor 1110. The processor 1110 can call and run computer programs from a memory to implement the method in the embodiments of the present disclosure.

In some embodiments, as shown in FIG. 28, the apparatus 1100 may further include a memory 1120. The processor 1110 can call and run the computer program from the memory 1120 to implement the method in the embodiments of the present disclosure.

The memory 1120 may be a separate device independent of the processor 1110 or may be integrated into the processor 1110.

In some embodiments, the apparatus 1100 may further include an input interface 1130. The processor 1110 can control the input interface 1130 to communicate with other devices or chips, and in particular to obtain information or data sent by other devices or chips.

In some embodiments, the apparatus 1100 may further include an output interface 1140. The processor 1110 may control the output interface 1140 to communicate with other devices or chips, and in particular to output information or data to other devices or chips.

In some embodiments, the apparatus can be applied to the access point device in the embodiments of the present disclosure, and the apparatus can implement the corresponding processes implemented by the AP in various methods according to the embodiments of the present disclosure. For the sake of brevity, it will not be elaborated herein.

In some embodiments, the apparatus can be applied to the station device in the embodiments of the present disclosure, and the apparatus can implement the corresponding processes implemented by the first STA in various methods according to the embodiments of the present disclosure. For the sake of brevity, it will not be elaborated herein.

In some embodiments, the apparatus mentioned in the embodiments of the present disclosure can also be referred to as a chip, such as a system level chip, a system chip, a chip system or an on-chip system chip, etc.

Figure 29:
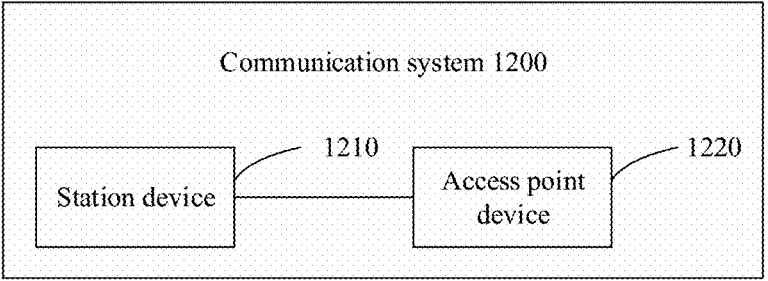
FIG. 29 is a schematic block diagram of a communication system provided according to an embodiment of the present disclosure.

FIG. 29 is a schematic block diagram of a communication system provided according to an embodiment of the present disclosure. As shown in FIG. 29, the communication system includes a station device 1210 and an access point device 1220.

The station device 1210 may be used to implement corresponding functions implemented by the first STA in the above methods, and the access point device 1220 may be used to implement corresponding functions implemented by the AP in the above methods. For the sake of brevity, it will not be elaborated herein.

Additional Embodiments

Embodiment 1. A method for wireless communication, comprising: transmitting, by an Access Point (AP), first information, the first information being used for sharing part or all of time domain resources of a transmission opportunity (TXOP) acquired by the AP to a plurality of stations (STAs), wherein the first information is used to indicate at least one of: address information of the plurality of the STAs, time duration information of time domain resources corresponding to the plurality of the STAs, start time domain positions of time domain resources corresponding to the plurality of the STAs, and time-frequency domain resources corresponding to the plurality of the STAs.

Embodiment 2. The method of embodiment 1, wherein the first information is transmitted through a first trigger frame.

Embodiment 3. The method of embodiment 1 or 2, wherein the first trigger frame comprises a TXOP sharing mode subfield, and the TXOP sharing mode subfield is set to a non-zero value.

Embodiment 4. The method of embodiment 1 or 2, wherein the first trigger frame is a Multiple Users Request-To-Transmit Transmission Opportunity Sharing Trigger Frame (MU-RTS TXS TF).

Embodiment 5. The method of any one of embodiments 1 to 4, wherein the method further comprises: receiving, by the AP, second information transmitted by a first STA of the plurality of the STAs, and the second information being used to instruct the first STA to release time domain resources shared to the first STA.

Embodiment 6. The method of embodiment 5, wherein the second information is a TXOP sharing release frame, or the second information is a contention free end frame.

Embodiment 7. The method of claim embodiment 5, wherein the second information is carried by a TXOP sharing termination subfield in a frame control field of a first Physical Layer Protocol Data Unit (PPDU).

Embodiment 8. The method of any one of embodiments 1 to 7, wherein the method further comprises: transmitting, by the AP, frames to at least one STA using remaining time domain resources shared to a first STA.

Embodiment 9. A method for wireless communication, comprising: receiving, by a first station (STA), first information transmitted by an Access Point (AP), the first information being used to share part or all of time domain resources of a transmission opportunity (TXOP) acquired by the AP to a plurality of STAs, and the plurality of the STAs comprising the first STA, wherein the first information is used to indicate at least one of: address information of the plurality of the STAs, time duration information of time domain resources corresponding to the plurality of the STAs, start time domain positions of time domain resources corresponding to the plurality of the STAs, and time-frequency domain resources corresponding to the plurality of the STAs.

Embodiment 10. The method of embodiment 9, wherein the method further comprises: transmitting, by the first STA, second information to the AP, and the second information being used to instruct the first STA to release time domain resources shared to the first STA.

Embodiment 11. The method of embodiment 10, wherein the second information is a TXOP sharing release frame, or the second information is a contention free end frame.

Embodiment 12. The method of embodiment 10, wherein the second information is carried by a TXOP sharing termination subfield in a frame control field of a first PPDU.

Embodiment 13. A method for wireless communication, comprising: determining, by an Access Point (AP), that part or all of time domain resources of an acquired transmission opportunity (TXOP) being shared to a plurality of stations (STAs); transmitting, by the AP, first information to a first STA of the plurality of the STAs, and the first information being used to indicate at least one of: address information of the first STA, time duration information of time domain resources corresponding to the first STA, a start time domain position of time domain resources corresponding to the first STA, and time-frequency domain resources corresponding to the first STA.

Embodiment 14. The method of embodiment 13, wherein the first information is transmitted through a first trigger frame.

Embodiment 15. The method of embodiment 13 or 14, wherein the first trigger frame is a Multiple Users Request-To-Transmit Transmission Opportunity Sharing Trigger Frame (MU-RTS TXS TF).

Embodiment 16. The method of any one of embodiments 13 to 15, wherein the method further comprises: receiving, by the AP, third information transmitted by the first STA, and the third information being used to instruct the first STA to release time domain resources shared to the first STA.

Embodiment 17. The method of embodiment 16, wherein the third information is a TXOP sharing release frame, or the third information is a contention free end frame.

Embodiment 18. The method of embodiment 16, wherein the third information is carried by a TXOP sharing termination subfield in a frame control field of a first Physical Layer Protocol Data Unit (PPDU).

Embodiment 19. A method for wireless communication, comprising: receiving, by a first station (STA), first information transmitted by an Access Point (AP), wherein the first STA belongs to a plurality of STAs, the plurality of the STAs are STAs sharing part or all of time domain resources of a transmission opportunity (TXOP) acquired by the AP, and the first information is used to indicate at least one of: address information of the first STA, time duration information of time domain resources corresponding to the first STA, a start time domain position of time domain resources corresponding to the first STA, and time-frequency domain resources corresponding to the first STA.

Embodiment 20. The method of claim embodiment 19, wherein the first information is transmitted through a first trigger frame.

Embodiment 21. The method of embodiment 19 or 20, wherein the first trigger frame is a Multiple Users Request-To-Transmit Transmission Opportunity Sharing Trigger Frame (MU-RTS TXS TF).

Embodiment 22. The method of any one of embodiments 19 to 21, wherein the method further comprises: transmitting, by the first STA, third information to the AP, and the third information being used to instruct the first STA to release time domain resources shared to the first STA.

Embodiment 23. The method of embodiment 22, wherein the third information is a TXOP sharing release frame, or the third information is a contention free end frame.

Embodiment 24. The method of embodiment 22, wherein the third information is carried by a TXOP sharing termination subfield in a frame control field of a first PPDU.

Embodiment 25. A method for wireless communication, comprising: acquiring, by an Access Point (AP), remaining time domain resources shared by the AP to a first STA of a plurality of stations (STAs).

Embodiment 26. The method of any one of embodiment 25, wherein the acquiring, by the AP, the remaining time domain resources shared by the AP to the first STA of the plurality of the STAs comprises: receiving, by the AP, second information transmitted by the first STA, and the second information being used to instruct the first STA to release time domain resources shared to the first STA.

Embodiment 27. The method of embodiment 26, wherein the second information is a TXOP sharing release frame, or the second information is a contention free end frame.

Embodiment 28. The method of embodiment 26, wherein the second information is carried by a TXOP sharing termination subfield in a frame control field of a first Physical Layer Protocol Data Unit (PPDU) transmitted by the first STA.

It is to be understood that the processor in the embodiments of the present disclosure may be an integrated circuit chip with signal processing capability. In the implementation process, various operations in the above method embodiment can be implemented by an integrated logic circuit of hardware in the processor or instructions in the form of software. The above processor can be a general purpose processor, a digital signal processor (DSPS), an application specific integrated circuit (ASIC), a field programmable gate array (FPGA) or other programmable logic devices, discrete gates or transistor logic devices, and discrete hardware components. Various methods, operations and logic block diagrams disclosed in the embodiments of the present disclosure can be implemented or executed. The general-purpose processor may be a microprocessor or the processor may be any conventional processor or the like. The operations of the methods disclosed in connection with the embodiments of the present disclosure can be directly embodied as being implemented by a hardware decoding processor, or by a combination of the hardware and software modules in the decoding processor. The software module can be located in a random memory, a flash memory, a read-only memory, a programmable read-only memory or an electrically erasable programmable memory, a register and other mature storage media in the art. The storage medium is located in the memory, and the processor reads information in the memory and implements the operations of the above methods in combination with its hardware.

It is to be understood that the memory in the embodiments of the present disclosure may be a volatile memory or a non-volatile memory, or may include both a volatile and a non-volatile memory. The nonvolatile memory can be a read-only memory (ROM), a programmable ROM (PROM), an erasable PROM (EPROM), an electrically EPROM (EE-PROM) or a flash memory. The Volatile memory can be a random access memory (RAM), which is used as an external cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the systems and methods described herein is intended to include, but is not limited to, memories of these and any other suitable type.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM, a DR RAM, etc. That is, the memory in the embodiments of the disclosure is intended to include but not limited to memories of these and any other suitable type.

The embodiments of the disclosure also provide a computer-readable storage medium for storing one or more computer programs.

In some embodiments, the computer-readable storage medium may be applied to the access point device of the embodiments of the disclosure. The computer programs may enable a computer to perform the corresponding processes implemented by the AP in various methods of the embodiments of the disclosure, which will not be elaborated herein for brief description.

In some embodiments, the computer-readable storage medium may be applied to the station device of the embodiments of the disclosure. The computer programs may enable a computer to perform the corresponding processes implemented by the first STA in various methods of the embodiments of the disclosure, which will not be elaborated herein for brief description.

The embodiments of the disclosure also provide a computer program product. The computer program product includes one or more computer program instructions.

In some embodiments, the computer program product may be applied to the access point device of the embodiments of the disclosure. The computer program instructions may enable a computer to perform the corresponding processes implemented by the AP in various methods of the embodiments of the disclosure, which will not be elaborated herein for brief description.

In some embodiments, the computer program product may be applied to the station device of the embodiments of the disclosure. The computer program instructions may enable a computer to perform the corresponding processes implemented by the first STA in various methods of the embodiments of the disclosure, which will not be elaborated herein for brief description.

The embodiments of the disclosure also provide a computer program.

In one example, the computer program may be applied to the access point device of the embodiments of the disclosure. The computer program, when executed by a computer, enables the computer to perform the corresponding processes implemented by the AP in various methods of the embodiments of the disclosure, which will not be elaborated herein for brief description.

In one example, the computer program may be applied to the station device of the embodiments of the disclosure. The computer program, when executed by a computer, enables the computer to perform the corresponding processes implemented by the first STA in various methods of the embodiments of the disclosure, which will not be elaborated herein for brief description.

Those of ordinary skill in the art may realize that the units and algorithm operations of various examples described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between various displayed or discussed components may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, various functional units in various embodiments of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the methods in various embodiments of the disclosure. The abovementioned storage medium includes:

various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for wireless communication, comprising:
determining, by an Access Point (AP), that part or all of time domain resources of an acquired transmission opportunity (TXOP) are to be shared to a first station (STA);
transmitting, by the AP, a first trigger frame to the first STA,
wherein the first trigger frame comprises a user information list field and the user information list field comprises a User Info field, wherein the User Info field comprises an Association Identifier AID12 subfield, which occupies bits B0 to B11 of the User Info field, and a resource unit allocation subfield, which occupies bits B12 to B19 of the User Info field,
wherein the User info field further comprises a duration allocation subfield, following the resource unit allocation subfield, which occupies bits B20 to B(20+M−1) of the User Info field, wherein the duration allocation subfield indicates time duration information allocated to the first STA and M is a positive integer smaller than 20.

2. The method of claim 1, wherein the duration allocation subfield is redefined from B20 to B(20+M−1) bits of 20 reserved bits which occupy B20 to B39 of the User Info field, wherein the User Info field comprises the AID12 subfield, the resource unit allocation subfield and 20 reserved bits.

3. The method of claim 1, wherein the M bits indicate $2^M$ time units, the time duration allocated to the first STA is obtained according to the $2^M$ time units.

4. The method of claim 1, wherein the duration allocation subfield is followed by reserved bits starting from B(20+M).

5. The method of claim 1, wherein the first STA is a non-AP STA.

6. The method of claim 1, wherein the first trigger frame is a Multiple Users Request-To-Transmit Transmission Opportunity Sharing Trigger Frame (MU-RTS TXS TF).

7. The method of claim 1, wherein the method further comprises:
receiving, by the AP, third information transmitted by the first STA, wherein the third information is used to instruct the first STA to release time domain resources shared to the first STA.

8. A method for wireless communication, comprising:
receiving, by a first station (STA), a first trigger frame transmitted by an Access Point (AP), wherein the first STA is a STA to be shared part or all of time domain resources of a transmission opportunity (TXOP) acquired by the AP,
wherein the first trigger frame comprises a user information list field and the user information list field comprises a User Info field, wherein the User Info field comprises an Association Identifier AID12 subfield, which occupies bits B0 to B11 of the User Info field, and a resource unit allocation subfield, which occupies bits B12 to B19 of the User Info field,
wherein the user info field further comprises a duration allocation subfield, following the resource unit allocation subfield, which occupies bits B20 to B(20+M−1) of the User Info field, wherein the duration allocation subfield indicates time duration information allocated to the first STA and M is a positive integer smaller than 20.

9. The method of claim 8, wherein the duration allocation subfield is redefined from B20 to B(20+M−1) bits of 20 reserved bits which occupy B20 to B39 of the User Info field, wherein the User Info field comprises the AID12 subfield, the resource unit allocation subfield and 20 reserved bits.

10. The method of claim 8, wherein the M bits indicate $2^M$ time units, the time duration allocated to the first STA is obtained according to the $2^M$ time units.

11. The method of claim 8, wherein the duration allocation subfield is followed by reserved bits starting from B(20+M).

12. The method of claim 8, wherein the first trigger frame is a Multiple Users Request-To-Transmit Transmission Opportunity Sharing Trigger Frame (MU-RTS TXS TF).

13. The method of claim 8, wherein the first STA is a non-AP STA.

14. A station device, wherein the station device is a first station (STA), the station device comprises a processor and a memory for storing a computer program, and the processor is configured to call and run the computer program stored in the memory to perform:
receiving a first trigger frame transmitted by an Access Point (AP), wherein the first STA is a STA to be shared part or all of time domain resources of a transmission opportunity (TXOP) acquired by the AP,
wherein the first trigger frame comprises a user information list field and the user information list field comprises a User Info field, wherein the User Info field comprises an Association Identifier AID12 subfield, which occupies bits B0 to B11 of the User Info field, and a resource unit allocation subfield, which occupies bits B12 to B19 of the User Info field,
wherein the user info field further comprises a duration allocation subfield, following the resource unit allocation subfield, which occupies bits B20 to B(20+M−1) of the User Info field, wherein the duration allocation subfield indicates time duration information allocated to the first STA and M is a positive integer smaller than 20.

15. The station device of claim 14, wherein the duration allocation subfield is redefined from B20 to B(20+M−1) bits of 20 reserved bits which occupy B20 to B39 of the User Info field, wherein the User Info field comprises the AID12 subfield, the resource unit allocation subfield and 20 reserved bits.

16. The station device of claim 14, wherein the M bits indicate $2^M$ time units, the time duration allocated to the first STA is obtained according to the $2^M$ time units.

17. The station device of claim 14, wherein the duration allocation subfield is followed by reserved bits starting from B(20+M).

18. The station device of claim 14, wherein the first trigger frame is a Multiple Users Request-To-Transmit Transmission Opportunity Sharing Trigger Frame (MU-RTS TXS TF).

19. The station device of claim 14, wherein the first STA is a non-AP STA.

20. The station device of claim 14, wherein the processor is further configured to call and run the computer program stored in the memory to perform:

transmitting third information to the AP, wherein the third information is used to instruct the first STA to release time domain resources shared to the first STA.

\* \* \* \* \*